United States Patent
Zhang et al.

(10) Patent No.: US 10,514,941 B2
(45) Date of Patent: Dec. 24, 2019

(54) LOAD BALANCING AND DESTINATION NETWORK ADDRESS TRANSLATION MIDDLEBOXES

(71) Applicant: Nicira, Inc., Palo Alto, CA (US)

(72) Inventors: Ronghua Zhang, San Jose, CA (US); Teemu Koponen, San Francisco, CA (US); Pankaj Thakkar, Santa Clara, CA (US); Martin Casado, Portola Valley, CA (US)

(73) Assignee: NICIRA, INC., Palo Alto, CA (US)

( * ) Notice: Subject to any disclaimer, the term of this patent is extended or adjusted under 35 U.S.C. 154(b) by 964 days.

(21) Appl. No.: 13/678,522

(22) Filed: Nov. 15, 2012

(65) Prior Publication Data

US 2013/0132532 A1 May 23, 2013

Related U.S. Application Data

(60) Provisional application No. 61/560,279, filed on Nov. 15, 2011.

(51) Int. Cl.
*H04L 12/24* (2006.01)
*H04L 29/06* (2006.01)
(Continued)

(52) U.S. Cl.
CPC .......... *G06F 9/45558* (2013.01); *H04L 41/08* (2013.01); *H04L 41/0803* (2013.01); *H04L 41/0806* (2013.01); *H04L 41/0813* (2013.01); *H04L 41/0823* (2013.01); *H04L 41/0889* (2013.01); *H04L 41/0893* (2013.01); *H04L 41/12* (2013.01); *H04L 45/64* (2013.01);
(Continued)

(58) Field of Classification Search
CPC . H04L 67/1002; H04L 67/1004; H04L 41/08; H04L 41/0806
USPC ........................................................ 709/220
See application file for complete search history.

(56) References Cited

U.S. PATENT DOCUMENTS 5,504,921 A 4/1996 Dev et al.
5,550,816 A 8/1996 Hardwick et al.
(Continued)

FOREIGN PATENT DOCUMENTS

AU 2012340383 4/2014
AU 2012340387 4/2014
(Continued)

OTHER PUBLICATIONS

Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.

(Continued)

*Primary Examiner* — June Y Sison
*Assistant Examiner* — Adam A Cooney
(74) *Attorney, Agent, or Firm* — Adeli LLP

(57) ABSTRACT

A controller of a network control system for configuring several middlebox instances is described. The middlebox instances implement a middlebox in a distributed manner in several hosts. The controller configures a first middlebox instance to obtain status of a set of servers and disseminate the obtained status to a second middlebox instance. The controller configures the second middlebox instance to use the status to select a server from the set of servers.

11 Claims, 13 Drawing Sheets

(51) Int. Cl.
  *H04L 12/931* (2013.01)
  *H04L 29/08* (2006.01)
  *H04L 29/12* (2006.01)
  *H04L 12/715* (2013.01)
  *H04L 12/751* (2013.01)
  *H04L 12/933* (2013.01)
  *G06F 9/455* (2018.01)

(52) U.S. Cl.
  CPC ............ *H04L 49/70* (2013.01); *H04L 61/256* (2013.01); *H04L 61/2517* (2013.01); *H04L 61/2521* (2013.01); *H04L 63/0218* (2013.01); *H04L 67/1008* (2013.01); *G06F 2009/4557* (2013.01); *G06F 2009/45595* (2013.01); *H04L 45/02* (2013.01); *H04L 49/15* (2013.01)

(56) References Cited

U.S. PATENT DOCUMENTS

| | | |
|---|---|---|
| 5,729,685 A | 3/1998 | Chatwani et al. |
| 5,751,967 A | 5/1998 | Raab et al. |
| 5,796,936 A | 8/1998 | Watabe et al. |
| 6,104,699 A | 8/2000 | Holender et al. |
| 6,219,699 B1 | 4/2001 | McCloghrie et al. |
| 6,353,614 B1 | 3/2002 | Borella et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,880,089 B1 | 4/2005 | Bommareddy et al. |
| 6,907,042 B1 | 6/2005 | Oguchi et al. |
| 6,963,585 B1 | 11/2005 | Le Pennec et al. |
| 7,046,630 B2 | 5/2006 | Abe et al. |
| 7,055,173 B1 | 5/2006 | Chaganty et al. |
| 7,126,923 B1 | 10/2006 | Yang et al. |
| 7,197,572 B2 | 3/2007 | Matters et al. |
| 7,209,439 B2 | 4/2007 | Rawlins et al. |
| 7,283,473 B2 | 10/2007 | Arndt et al. |
| 7,286,490 B2 | 10/2007 | Saleh et al. |
| 7,342,916 B2 | 3/2008 | Das et al. |
| 7,343,410 B2 | 3/2008 | Mercier et al. |
| 7,450,598 B2 | 11/2008 | Chen et al. |
| 7,478,173 B1 | 1/2009 | Delco |
| 7,512,744 B2 | 3/2009 | Banga et al. |
| 7,555,002 B2 | 6/2009 | Arndt et al. |
| 7,606,260 B2 | 10/2009 | Oguchi et al. |
| 7,627,692 B2 | 12/2009 | Pessi |
| 7,649,851 B2 | 1/2010 | Takashige et al. |
| 7,706,266 B2 | 4/2010 | Plamondon |
| 7,710,874 B2 | 5/2010 | Balakrishnan et al. |
| 7,730,486 B2 | 6/2010 | Herington |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,856,549 B2 | 12/2010 | Wheeler |
| 7,885,276 B1 | 2/2011 | Lin |
| 7,925,850 B1 | 4/2011 | Waldspurger |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,190,767 B1 | 5/2012 | Maufer et al. |
| 8,194,674 B1 | 6/2012 | Pagel et al. |
| 8,199,750 B1 | 6/2012 | Schultz et al. |
| 8,204,982 B2 | 6/2012 | Casado et al. |
| 8,224,931 B1 | 7/2012 | Brandwine et al. |
| 8,224,971 B1 | 7/2012 | Miller et al. |
| 8,265,075 B2 | 9/2012 | Pandey |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,456,984 B2 | 6/2013 | Ranganathan et al. |
| 8,463,904 B2 | 6/2013 | Casado et al. |
| 8,468,548 B2 | 6/2013 | Kulkarni et al. |
| 8,571,031 B2 | 10/2013 | Davies et al. |
| 8,611,351 B2 | 12/2013 | Gooch et al. |
| 8,612,627 B1 | 12/2013 | Brandwine et al. |
| 8,621,058 B2 | 12/2013 | Eswaran et al. |
| 8,625,594 B2 | 1/2014 | Safrai et al. |
| 8,644,188 B1 | 2/2014 | Brandwine et al. |
| 8,650,299 B1 | 2/2014 | Huang et al. |
| 8,650,618 B2 | 2/2014 | Asati et al. |
| 8,743,885 B2 | 6/2014 | Khan et al. |
| 8,762,501 B2 | 6/2014 | Kempf et al. |
| 8,913,661 B2 | 12/2014 | Koponen et al. |
| 8,966,024 B2 | 2/2015 | Koponen et al. |
| 8,966,029 B2 | 2/2015 | Zhang et al. |
| 9,015,823 B2 | 4/2015 | Koponen et al. |
| 9,172,603 B2 | 10/2015 | Padmanabhan et al. |
| 9,195,491 B2 | 11/2015 | Zhang et al. |
| 2001/0043614 A1 | 11/2001 | Viswanadham et al. |
| 2002/0034189 A1 | 3/2002 | Haddock et al. |
| 2002/0093952 A1 | 7/2002 | Gonda |
| 2002/0161867 A1 | 10/2002 | Cochran et al. |
| 2002/0194369 A1 | 12/2002 | Rawlins et al. |
| 2003/0009559 A1* | 1/2003 | Ikeda .......................... 709/225 |
| 2003/0058850 A1 | 3/2003 | Rangarajan et al. |
| 2003/0093481 A1 | 3/2003 | Mitchell et al. |
| 2003/0069972 A1 | 4/2003 | Yoshimura et al. |
| 2003/0079000 A1 | 4/2003 | Chamberlain |
| 2004/0049701 A1 | 3/2004 | Le Pennec et al. |
| 2004/0054793 A1 | 3/2004 | Coleman |
| 2004/0073659 A1 | 4/2004 | Rajsic et al. |
| 2004/0098505 A1 | 5/2004 | Clemmensen |
| 2004/0131059 A1 | 7/2004 | Ayyakad et al. |
| 2005/0013280 A1 | 1/2005 | Buddhikot et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0050377 A1 | 3/2005 | Chan et al. |
| 2005/0083953 A1 | 4/2005 | May |
| 2005/0132030 A1 | 6/2005 | Hopen et al. |
| 2005/0249199 A1 | 11/2005 | Albert et al. |
| 2006/0026225 A1 | 2/2006 | Canali et al. |
| 2006/0092976 A1 | 5/2006 | Lakshman et al. |
| 2006/0215684 A1 | 9/2006 | Capone |
| 2006/0221961 A1 | 10/2006 | Basso et al. |
| 2007/0101323 A1 | 5/2007 | Foley et al. |
| 2007/0101421 A1 | 5/2007 | Wesinger, Jr. et al. |
| 2007/0140128 A1 | 6/2007 | Klinker et al. |
| 2007/0233838 A1 | 10/2007 | Takamoto et al. |
| 2007/0239987 A1 | 10/2007 | Hoole et al. |
| 2007/0266433 A1 | 11/2007 | Moore |
| 2007/0283348 A1 | 12/2007 | White |
| 2007/0286185 A1 | 12/2007 | Eriksson et al. |
| 2008/0002579 A1 | 1/2008 | Lindholm et al. |
| 2008/0005293 A1 | 1/2008 | Bhargava et al. |
| 2008/0049621 A1* | 2/2008 | McGuire et al. .......... 370/236.2 |
| 2008/0071900 A1 | 3/2008 | Hecker et al. |
| 2008/0072305 A1 | 3/2008 | Casado et al. |
| 2008/0151893 A1 | 6/2008 | Nordmark et al. |
| 2008/0163207 A1 | 7/2008 | Reumann et al. |
| 2008/0186990 A1 | 8/2008 | Abali et al. |
| 2008/0189769 A1 | 8/2008 | Casado et al. |
| 2008/0196100 A1 | 8/2008 | Madhavan et al. |
| 2008/0225853 A1 | 9/2008 | Melman et al. |
| 2008/0240122 A1 | 10/2008 | Richardson et al. |
| 2009/0031041 A1 | 1/2009 | Clemmensen |

(56) References Cited

U.S. PATENT DOCUMENTS

| | | |
|---|---|---|
| 2009/0063750 A1 | 3/2009 | Dow |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0129271 A1 | 5/2009 | Ramankutty et al. |
| 2009/0150527 A1 | 6/2009 | Tripathi et al. |
| 2009/0161547 A1 | 6/2009 | Riddle et al. |
| 2009/0240924 A1 | 9/2009 | Yasaki et al. |
| 2009/0249470 A1 | 10/2009 | Litvin et al. |
| 2009/0249472 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2009/0327464 A1 | 12/2009 | Archer et al. |
| 2010/0046530 A1 | 2/2010 | Hautakorpi et al. |
| 2010/0046531 A1 | 2/2010 | Louati et al. |
| 2010/0115080 A1 | 5/2010 | Kageyama |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0131638 A1* | 5/2010 | Kondamuru ............ 709/224 |
| 2010/0138830 A1 | 6/2010 | Astete et al. |
| 2010/0153554 A1 | 6/2010 | Anschutz et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0214949 A1 | 8/2010 | Smith et al. |
| 2010/0254385 A1 | 10/2010 | Sharma et al. |
| 2010/0257263 A1 | 10/2010 | Casado et al. |
| 2010/0275199 A1 | 10/2010 | Smith et al. |
| 2010/0287548 A1 | 11/2010 | Zhou et al. |
| 2010/0318665 A1 | 12/2010 | Demmer et al. |
| 2011/0022695 A1 | 1/2011 | Dalal et al. |
| 2011/0026521 A1 | 2/2011 | Gamage et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0119748 A1 | 5/2011 | Edwards et al. |
| 2011/0173692 A1 | 7/2011 | Liu et al. |
| 2011/0225594 A1 | 9/2011 | Iyengar et al. |
| 2011/0255538 A1 | 10/2011 | Srinivasan et al. |
| 2011/0261825 A1 | 10/2011 | Ichino |
| 2011/0299534 A1 | 12/2011 | Koganti et al. |
| 2011/0299538 A1 | 12/2011 | Maruta |
| 2011/0310899 A1 | 12/2011 | Alkhatib et al. |
| 2012/0011264 A1 | 1/2012 | Izawa |
| 2012/0014386 A1 | 1/2012 | Xiong et al. |
| 2012/0144014 A1 | 6/2012 | Natham et al. |
| 2012/0155266 A1 | 6/2012 | Patel et al. |
| 2012/0185577 A1 | 7/2012 | Giaretta et al. |
| 2012/0236734 A1 | 9/2012 | Sampath et al. |
| 2012/0240182 A1 | 9/2012 | Narayanaswamy et al. |
| 2012/0246637 A1 | 9/2012 | Kreeger et al. |
| 2012/0281540 A1 | 11/2012 | Khan et al. |
| 2013/0003735 A1* | 1/2013 | Chao ............ H04L 45/66 370/392 |
| 2013/0036416 A1 | 2/2013 | Raju et al. |
| 2013/0041987 A1 | 2/2013 | Warno |
| 2013/0054761 A1 | 2/2013 | Kempf et al. |
| 2013/0061047 A1 | 3/2013 | Sridharan et al. |
| 2013/0073743 A1 | 3/2013 | Ramasamy et al. |
| 2013/0103834 A1 | 4/2013 | Dzerve et al. |
| 2013/0121209 A1 | 5/2013 | Padmanabhan et al. |
| 2013/0125120 A1 | 5/2013 | Zhang et al. |
| 2013/0125230 A1 | 5/2013 | Koponen et al. |
| 2013/0128891 A1 | 5/2013 | Koponen et al. |
| 2013/0132531 A1 | 5/2013 | Koponen et al. |
| 2013/0132533 A1 | 5/2013 | Padmanabhan et al. |
| 2013/0132536 A1 | 5/2013 | Zhang et al. |
| 2013/0163427 A1 | 6/2013 | Beliveau et al. |
| 2013/0163475 A1 | 6/2013 | Beliveau et al. |
| 2013/0163594 A1 | 6/2013 | Sharma et al. |
| 2013/0332983 A1 | 12/2013 | Koorevaar et al. |
| 2014/0016501 A1 | 1/2014 | Kamath et al. |
| 2014/0019639 A1 | 1/2014 | Ueno |
| 2014/0068602 A1 | 3/2014 | Gember et al. |
| 2014/0153577 A1 | 6/2014 | Janakiraman et al. |
| 2014/0169375 A1 | 6/2014 | Khan et al. |
| 2014/0195666 A1 | 7/2014 | Dumitriu et al. |
| 2014/0359620 A1 | 12/2014 | Kerkwyk et al. |
| 2015/0081861 A1 | 3/2015 | Koponen et al. |
| 2015/0098360 A1 | 4/2015 | Koponen et al. |
| 2015/0124651 A1 | 5/2015 | Zhang et al. |
| 2015/0142938 A1 | 5/2015 | Koponen et al. |
| 2015/0222598 A1 | 8/2015 | Koponen et al. |

FOREIGN PATENT DOCUMENTS

| | | |
|---|---|---|
| AU | 2012340383 | 3/2015 |
| AU | 2012340387 | 3/2015 |
| AU | 2012340383 | 12/2015 |
| AU | 2012340387 | 12/2015 |
| EP | 1653688 | 5/2006 |
| EP | 2748713 | 7/2014 |
| EP | 2748714 | 7/2014 |
| EP | 2748716 | 7/2014 |
| EP | 2748717 | 7/2014 |
| EP | 2748750 | 7/2014 |
| EP | 2748978 | 7/2014 |
| EP | 12850665.6 | 10/2014 |
| EP | 12849015.8 | 1/2015 |
| EP | 12849104.0 | 1/2015 |
| EP | 12849710.4 | 1/2015 |
| EP | 12850519.5 | 1/2015 |
| EP | 12849295.6 | 3/2015 |
| EP | 12849015 | 7/2015 |
| EP | 12849104 | 7/2015 |
| EP | 12849710 | 7/2015 |
| EP | 12850519 | 7/2015 |
| EP | 12849295 | 9/2015 |
| EP | 12850665 | 11/2015 |
| JP | 2003-124976 | 4/2003 |
| JP | 2003-318949 | 11/2003 |
| JP | 2011188433 A | 9/2011 |
| JP | 2011211502 A | 10/2011 |
| WO | WO 99/18534 | 4/1999 |
| WO | WO 2005/112390 | 11/2005 |
| WO | WO 2008/095010 | 8/2008 |
| WO | 2010116606 A1 | 10/2010 |
| WO | WO 2013/074827 | 5/2013 |
| WO | WO 2013/074828 | 5/2013 |
| WO | WO 2013/074831 | 5/2013 |
| WO | WO 2013/074842 | 5/2013 |
| WO | WO 2013/074844 | 5/2013 |
| WO | WO 2013/074847 | 5/2013 |
| WO | WO 2013/074855 | 5/2013 |
| WO | PCT/US2012/065359 | 5/2014 |

OTHER PUBLICATIONS

Foster, Nate, et al., "Frenetic: A Network Programming Language," ICFP '11, Sep. 19-21, 2011, 13 pages, Tokyo, Japan.

Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 1 of 2, pp. 1-79.

Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 2 of 2, pp. 80-167.

Loo, Boon Thau, et al., "Declarative Routing: Extensible Routing with Declarative Queries," In Proc. of SIGCOMM, Aug. 21-26, 2005, 14 pages, Philadelphia, PA, USA.

Loo, Boon Thau, et al., "Implementing Declarative Overlays," In Proc. of SOSP, Oct. 2005, 16 pages, Brighton, UK.

(56) References Cited

OTHER PUBLICATIONS

Sekar, Vyas, et al., "Design and Implementation of a Consolidated Middlebox Architecture," In Proc. of NSDI, Month Unknown, 2012, 14 pages.
Shenker, Scott, et al., "The Future of Networking, and the Past of Protocols," Dec. 2, 2011, pp. 1-30, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Das, Suarav, et al., "Unifying Packet and Circuit Switched Networks with OpenFlow," Dec. 7, 2009, 10 pages.
Das, Suarav, et al. "Simple Unified Control for Packet and Circuit Networks," Month Unknown, 2009, pp. 147-148, IEEE.
Portions of prosecution history of U.S. Appl. No. 13/678,498, dated Jun. 25, 2014, Nicira, Inc.
Portions of prosecution history of U.S. Appl. No. 13/678,485, dated Jun. 26, 2014, Nicira, Inc.
Portions of prosecution history of U.S. Appl. No. 13/678,518, dated Aug. 18, 2014, Nicira, Inc.
Portions of prosecution history of U.S. Appl. No. 13/678,504, dated Jul. 9, 2014, Nicira, Inc.
Portions of prosecution history of U.S. Appl. No. 13/678,512, dated Jul. 23, 2014, Nicira, Inc.
Wang, Wei-Ming, et al., "Analysis and Implementation of an Open Programmable Router Based on Forwarding and Control Element Separation," Sep. 2008, pp. 769-779, Journal of Computer Science and Technology.
Andersen, David, et al., "Resilient Overlay Networks," Oct. 2001, 15 pages, 18th ACM Symp. on Operating Systems Principles (SOSP), Banff, Canada, ACM.
Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Author Unknown, "Cisco Nexis 1000V Series Switches," Date Unknown but prior to Jul. 29, 2010, 2 pages, Cisco Systems, Inc., http://web.archive.org/web/20100729045626/http://www.cisco.com/en/US/Products/ps9902/index.html.
Author Unknown, "Cisco VN-Link: Virtualization-Aware Networking," Month Unknown, 2009, 10 pages, Cisco Systems, Inc.
Author Unknown, "Cisco VN-Link: Virtual Machine-Aware Networking," Apr. 2009, 2 pages, Cisco Systems, Inc.
Author Unknown, "Intel 82599 10 Gigabit Ethernet Controller: Datasheet, Revision: 2.73," Dec. 2011, 930 pages, Intel Corporation.
Author Unknown, "Virtual Machine Device Queues," White Paper, Month Unknown, 2007, pp. 1-4, Intel Corporation.
Author Unknown, "VMare for Linux Networking Support," Date Unknown but prior to Nov. 17, 1999, pp. 1-5, VMWare, Inc.
Barham, Paul, et al., "Xen and the Art of Virtualization," Oct. 19-22, 2003, pp. 1-14, SOSP'03, Bolton Landing New York, USA.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "SANE: A Protection Architecture for Enterprise Networks," In proceedings of Usenix Security, Aug. 2006, pp. 1-15.
Casado, Martin, et al., "Scaling Out: Network Virtualization Revisited," Month Unknown, 2010, pp. 1-8.,.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Davoli, Renzo, "VDE: Virtual Distributed Ethernet," TRIDENTCOM'05, Feb. 23-25, 2005, pp. 1-8, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism To Scale Software Routers," SOSP'09, Proceedings of the ACM SIGOPS 22nd Symposium on Operating Systems Principles, Oct. 2009, pp. 1-17, ACM New York, NY.
Farrel, A., "A Path Computation Element (PCS)—Based Architecture," Aug. 2006, pp. 1-41, RFC 4655.
Fischer, Anna, "[Patch][RFC] net/bridge: add basic VEPA support," Jun. 2009, pp. 1-5, GMANE Org.
Garfinkel, Tal, et al., "A Virtual Machine Introspection Based Architecture for Intrusion Detection," In Proc. Network and Distributed Systems Security Symposium, Feb. 2003, pp. 1-16.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and The Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," ACM SIGCOMM Computer communication Review, Jul. 2008, pp. 105-110, vol. 38, No. 3.
Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, pp. 1-10, ACM, Athens, Greece.
Joseph, Dilip, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," Month Unknown, 2010, pp. 1-6.
Koponen, Teemu, et al., "Onix: A Distributed Control Platform for Large-scale Production Networks," In Proc. OSDI, Oct. 2010, pp. 1-14.
Lakshminarayanan, Karthik, et al., "Routing as a Service," Month Unknown, 2004, pp. 1-15, Berkeley, California.
Luo, Jianying, et al., "Prototyping Fast, Simple, Secure Switches for Ethane," Month Unknown, 2007, pp. 1-6.
McKeown, Nick, et al., "OpenFlow: Enabling Innovation in Campus Networks," ACS SIGCOMM Computer communication Review, Apr. 2008, pp. 69-74, vol. 38, No. 2.
Mogul, Jeffrey C., et al., "API Design Challenges for Open Router Platforms on Proprietary Hardware," Oct. 2008, pp. 1-6.
Popa, Lucian, et al., "Building Extensible Networks with Rule-Based Forwarding," In USENIX OSDI, Month Unknown, 2010, pp. 1-14.
Yang, L., et al., "Forwarding and Control Element Separation (ForCES) Framework," Apr. 2004, pp. 1-40, The Internet Society.
U.S. Appl. No. 14/549,512, filed Nov. 20, 2014, Koponen, Teemu, et al.
U.S. Appl. No. 14/595,195, filed Jan. 12, 2015, Zhang, Ronghua, et al.
U.S. Appl. No. 14/595,199, filed Jan. 12, 2015, Koponen, Teemu, et al.
U.S. Appl. No. 13/678,518, filed Sep. 2, 2014, Koponen, Teemu, et al.
U.S. Appl. No. 13/678,504, filed Dec. 19, 2014, Koponen, Teemu, et al.
U.S. Appl. No. 13/678,512, filed Mar. 10, 2015, Padmanabhan, Amar, et al.

(56) References Cited

OTHER PUBLICATIONS

U.S. Appl. No. 13/678,498, filed Jan. 23, 2015, Koponen, Teemu, et al.
U.S. Appl. No. 13/678,536, filed Mar. 18, 2015, Padmanabhan, Amar, et al.
U.S. Appl. No. 13/678,485, filed Jan. 23, 2015, Zhang, Ronghua, et al.
U.S. Appl. No. 13/678,520, filed Feb. 11, 2015, Zhang, Ronghua, et al.
Author Unknown, "Enabling Service Chaining on Cisco Nexus 1000V Series," Month Unknown, 2012, 25 pages, CISCO.
Dumitriu, Dan Mihai, et al. (U.S. Appl. No. 61/514,990), filed Aug. 4, 2011.
Kent, S., "IP Encapsulating Security Payload (ESP)," Dec. 2005, pp. 1-44, The Internet Society.
Stiemerling, M., et al., "Middlebox Communication (MIDCOM) Protocol Semandtics," Mar. 2008, 70 pages, Internet Engineering Task Force.
Basak, Debashis, et al., "Virtualizing Networking and Security in the Cloud," Month Unknown, 2010, 9 pages, VMware, Inc., Palo Alto, CA.
Borella, Michael, et al. "Distributed Network Address Translation," Oct. 1998, 26 pages, 3Com Corp.
Zheng, Linfeng John, "Host-initiated NAT," draft-zheng-host-initiated-nat-01.txt, Mar. 30, 2011, pp. 1-7.
Mahalingham, Mallik, et al., "VXLAN: A Framework for Overlaying Virtualized Layer 2 Networks over Layer 3 Networks," Internet Draft, August 26, 2011, 20 pages, Internet Engineering Task Force.
Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.
Examination Report of commonly owned European Patent Application EP12849104.0, dated Feb. 27, 2017, 6 pages, European Patent Office.

\* cited by examiner

LOAD BALANCING AND DESTINATION NETWORK ADDRESS TRANSLATION MIDDLEBOXES

CLAIM OF BENEFIT TO PRIOR APPLICATION

This application claims the benefit of U.S. Provisional Application No. 61/560,279, entitled "Virtual Middlebox Services", filed Nov. 15, 2011. U.S. Application No. 61/560,279 is incorporated herein by reference.

BACKGROUND

Many current enterprises have large and sophisticated networks comprising switches, hubs, routers, middleboxes, servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual network components. Network configurations often depend on the underlying network: for example, blocking a user's access with an access control list ("ACL") entry requires knowing the user's current IP address. More complicated tasks require more extensive network knowledge: for example, forcing guest users' port 80 traffic to traverse an HTTP proxy requires knowing the current network topology and the location of each guest. This process is of increased difficulty where the network switching elements are shared across multiple users.

In response, there is a growing movement towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals result in hampering at least one of the others. For instance, one can easily provide network mobility for virtual machines within an L2 domain, but L2 domains cannot scale to large sizes. Furthermore, retaining user isolation greatly complicates mobility. As such, improved solutions that can satisfy the scalability, mobility, and multi-tenancy goals are needed.

BRIEF SUMMARY

Some embodiments of the invention provide a network control system that allows a user to specify a logical network that includes one or more logical forwarding elements (e.g., logical switches, logical routers, etc.) and one or more middleboxes (e.g., firewalls, load balancers, network address translators, intrusion detection systems (IDS), wide area network (WAN) optimizers, etc.). The system implements the user-specified logical forwarding elements across numerous managed switching elements on numerous physical machines that also host virtual machines of the logical network. The system implements the user-specified middleboxes across the numerous physical machines. Typically, the system of some embodiments configures, in one physical machine, a managed switching element that implements at least part of the logical switching elements and a distributed middlebox instance that provides a middlebox service to the packets forwarded by the managed switching element.

In some embodiments, a managed switching element that receives a packet from a virtual machine (VM), which is hosted in the same physical machine in which the managed switching element is hosted, performs all or most of logical forwarding processing of the logical forwarding elements on the received packet. Because the managed switching element receives the packet from the VM and performs forwarding processing on the packet, the managed switching element is the first-hop managed switching element with respect to the packet. While the first-hop managed switching element is performing the logical forwarding of the packet, the first-hop managed switching element uses the distributed middlebox instance to process the packet according to the middlebox service that the distributed middlebox instance provides.

In some embodiments, a distributed middlebox instance provides a load balancing service to the packets forwarded by a managed switching element, which is hosted in the same physical machine in which the distributed middlebox instance is hosted, as the first-hop managed switching element. A distributed middlebox instance that provides a load balancing service typically sits in front of a cluster of servers. The servers are represented by a virtual network address, which is the address that clients use to access a service (e.g., world wide web service) collectively provided by the cluster of servers. The distributed middlebox instance receives requests from the client virtual machines that are hosted in the same physical machine in which the distributed middlebox instance is hosted. The distributed middlebox instance may also receive requests from the client machines that are in the external network other than the logical network of the user. The distributed middlebox instance then chooses one of the servers in the cluster using a scheduling algorithm and forwards the requests to the chosen server. The distributed middlebox of some embodiments adds a connection table so that subsequent packets for the connection are sent to the same server.

The load balancer also periodically checks the health status of the servers and updates the server list used by the scheduling algorithm accordingly. Scheduling algorithms may also take into account the server load information, which can be included in the health status. Each distributed middlebox instance that balances the workload for the same set of servers needs the health status of the same set of servers. The distributed middlebox instances of different embodiments obtain the health status of a set of servers differently. For instance, in some embodiments, each distributed middlebox instance individually contact each of the servers. In other embodiments, the network control system designates one of the distributed middlebox instances to get health status of the set of servers and have the designated middlebox instance to disseminate the obtained health status information to other middlebox instances hosted in other physical machines. Alternatively or conjunctively, the network control system designates two or more distributed middlebox instances and lets each of the distributed middlebox instance get health status of a non-overlapping subset of the servers.

In some embodiments, the network control system configures the distributed middlebox instances to implement a middlebox that provides a destination network address translation (DNAT) service. That is, the distributed middlebox instance in these embodiments receives a packet and translates the destination address (L2 or L3 address) into another address in order to hide the real destination address from the sender of the packet. In some embodiments, the distributed middlebox instances implement a middlebox that provides a DNAT service and a middlebox that provides a load balancing service together.

The network control system of some embodiments implements a middlebox that provides a DNAT service and a middlebox that provides a load balancing service in a distributed manner. The network control system receives, from a user, configuration data for configuring the middlebox, including load balancing algorithm, DNAT rules, etc., to use to select a server and translate destination address of incoming packets into real address of the server. The network control system configures the distributed middlebox instances that implement the middlebox in a similar way in which the network control system configures the managed switching elements to perform logical forwarding processing of the logical switching elements of the user.

In some embodiments, the network control system has several controllers including logical controllers and physical controllers. A logical controller is a master of logical switching elements of a user. A logical controller of some embodiments receives specification of the logical switching elements from the user, in the form of logical control plane (LCP) data. The logical controller translates the LCP data into logical forwarding plane (LFP) data, which define control plane and forwarding plane of the logical switching elements. The logical controller then translates the LFP data to the universal physical control plane data. The logical controller then identifies a set of physical controllers, each of which is responsible for managing a managed switching element. The logical controller sends the universal control plane data only to the identified set of physical controllers that manage managed switching elements each of which at least partially implements the logical switching elements of the user.

A physical controller translates the universal physical control plane data into customized physical control plane data, which is control plane data for the managed switching elements that implement the logical switching elements. A physical controller sends the customized physical control plane data to the managed switching element. The managed switching elements than translate the customized control plane to perform the logical forwarding processing of the logical switching elements specified by the user.

Similarly, a logical controller receives configuration data for configuring the middlebox. The logical controller identifies the same set of physical controllers which are masters of the managed switching elements that implement at least partially the logical switching elements specified by the user. The logical controller sends the middlebox configuration data to the identified set of physical controllers. The physical controller of some embodiments then sends the middlebox configuration data to the managed switching elements so that the managed switching elements can send the middlebox configuration data to the distributed middlebox instances. Alternatively, the physical controller sends the middlebox configuration data directly to the distributed middlebox instance, which is hosted in the same physical machine in which the managed switching elements of which the physical controller is the master.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
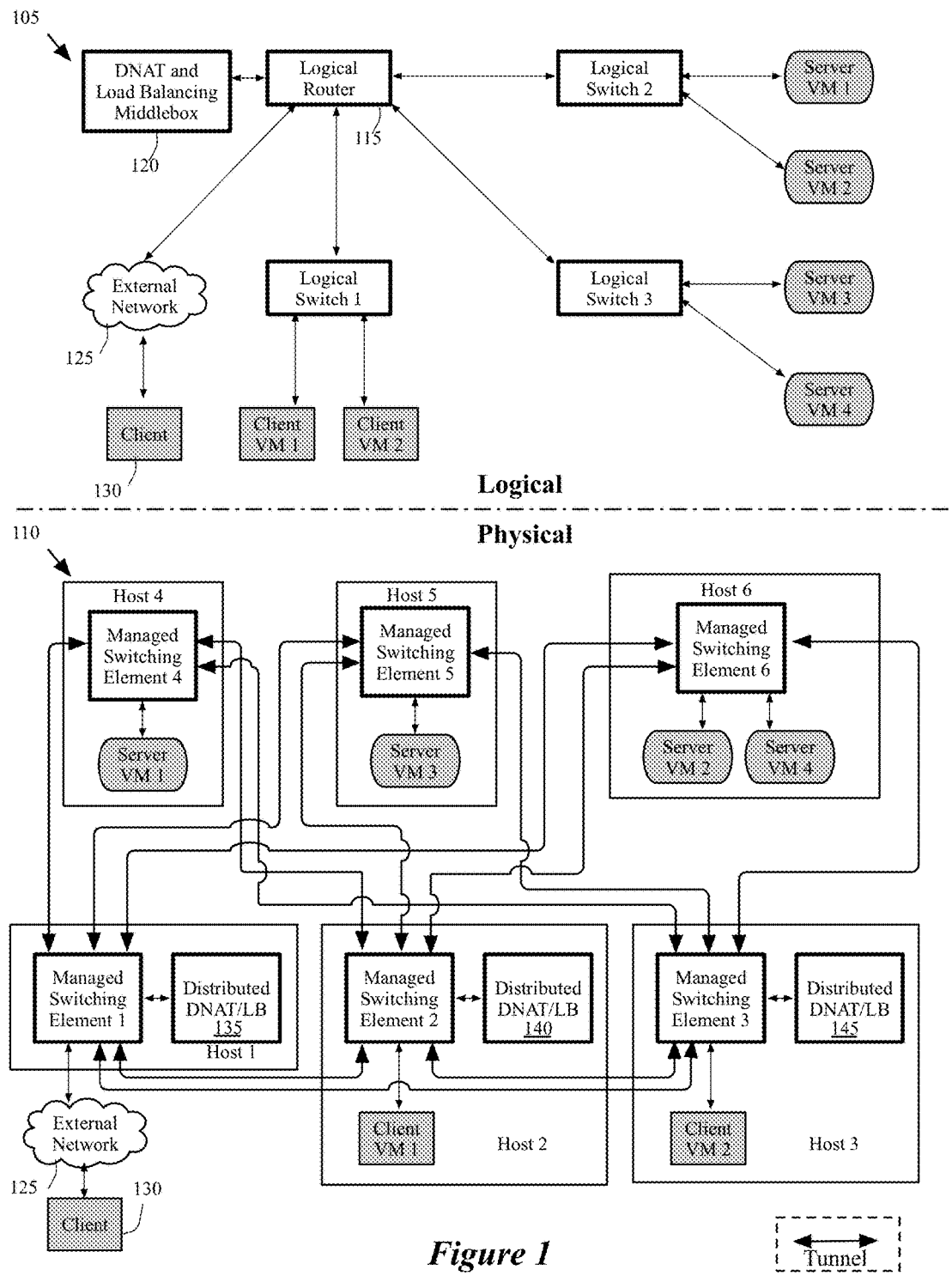
FIG. 1 illustrates an example network structure of a logical network of a user that is implemented in the infrastructure of a physical network.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network control system that allows logical datapath sets of different users to be implemented by switching elements of a physical network. These switching elements are referred to below as managed switching elements (MSEs) or managed forwarding elements as they are managed by the network control system in order to implement the logical datapath sets. Examples of such switching elements include virtual or physical network switches, software switches (e.g., Open vSwitch (OVS)), routers, etc. In some embodiments, the logical datapath sets are implemented in the managed switching element in a manner that prevents different users from viewing or controlling each other's logical datapath sets (i.e., each other's switching logic) while sharing the same switching elements.

To implement logical datapath sets, the network control system of some embodiments generates physical control plane data from logical datapath sets data specified by the users. The physical control plane data is then downloaded to the MSEs. The MSEs convert the physical control plane data into physical forwarding plane data that allows the MSEs to perform forwarding of the packets that these MSEs receive. Based on the physical forwarding data, the MSEs can process data packets in accordance with the logical processing rules specified within the physical control plane data.

In some embodiments, each of the logical datapath sets defines a logical network that includes one or more logical switching elements. A logical switching element can process incoming packets in layer 2 (L2) or layer 3 (L3). That is, a logical switching element can function as a logical switch for switching packets at L2 and/or as a logical router for routing packets at L3. The network control system implements the logical switching elements of different users across the MSEs.

In addition to the logical switching elements, the network control system of some embodiments allows the users to specify middleboxes. As known in the art, middleboxes perform data processing other than forwarding the data (e.g., network address translation, load balance, firewall, intrusion detection and prevention, wide area network optimization, etc.). The middleboxes provide these middlebox services to the users' respective logical switching elements. The network control system implements the specified middleboxes in physical infrastructure of the physical network, including the hosts in which the MSEs operate.

Several examples of the network control system of some embodiments are described below in Section I. Section II then describes distributed middlebox instances that provide load balancing and/or DNAT services. Finally, Section III describes an electronic system that implements some embodiments of the invention.

I. Implementing Logical Switching Elements and Middleboxes in a Distributed Manner A. Load Balancing and Destination Network Address Translation Middlebox FIG. 1 illustrates an example network structure of a logical network of a user that is implemented in the infrastructure of a physical network. Specifically, this figure illustrates that the logical network includes a middlebox and the middlebox is implemented in the physical network in a distributed manner. The top half of the figure shows a logical network 105 while the bottom half of the figure shows a physical network 110 in which the logical network 105 is implemented.

As shown in the top half of the figure, the logical network 105 includes three logical switches 1-3, a logical router 115, and a middlebox 120. The logical switch 1 is connected to client virtual machines (VMs) 1 and 2 and the logical router 115. There may be many other VMs connected to the logical switch 1, which are not depicted in this figure for the simplicity of illustration and description. The logical switch 1 forwards data between VMs connected to the logical switch 1 at L2 (e.g., by using MAC addresses) and between the VMs and the logical router 115 when the data needs routing at L3 (e.g., by using IP addresses). The logical switch 2 forwards data between the logical router 115 and the server VMs 1 and 2 connected to the logical switch 2. The logical switch 3 forwards data between the logical router 115 and the server VMs 3 and 4 connected to the logical switch 3.

The logical router 115 routes data at L3, among the logical switches connected to the logical router and the middlebox 120. When the data needs destination network address translation (DNAT) and load balancing service, the logical router 115 sends the data to the middlebox 120 to process and in some cases receives the processed data back from the middlebox to route the data to the data's destination. The logical router 115 also routes data to and from a client 130 through an external network 125, which includes network elements (not shown) that do not implement the logical switching elements in the logical network 105 nor are part of the physical network 110. The client 130 is a machine (e.g., a computer, a virtual machine, etc.) that is capable of exchanging data with another machine.

In this example, the server VMs 1-4 provide the same service (e.g., world wide web service) and are behind a single virtual address (e.g., a single IP address). That is, the VMs 1-4 collectively act as a single server providing the service to the clients. The client VMs and the external client 130 use the virtual address to access the servers. The middlebox 120 translates the virtual address into a different real network address of one of the server VMs. In choosing a server VM, the middlebox 120 of some embodiments uses a scheduling scheme to balance the workload on different server VMs. In some embodiments, the middlebox 120 is a single middlebox performing both DNAT and load balancing. In other embodiments, the middlebox 120 includes two separate middleboxes performing DNAT and load balancing separately.

As shown in the bottom half of FIG. 1, the physical network 110 includes hosts 1-6. A host is a machine that is managed by an operating system (e.g., Linux™, Windows™, etc.) that is capable of running software applications and virtual machines. Each of the hosts has several network elements running in the host, including several MSEs, several distributed middlebox instances, and/or several VMs. Not all of these network elements are depicted in each host in this figure for the simplicity of illustration and description. In some embodiments, a MSE is a software switching element (e.g., an OVS) that has components running in the user space and/or the kernel of the host on which the software is running. Also, a distributed middlebox instance in some embodiments is a software application that has components running in the user space and/or the kernel. In some embodiments, a distributed middlebox instance is provisioned in a VM running in the host in which the MSE is running.

As shown, the host 1 includes MSE 1 and a distributed middlebox instance 135. The MSE 1 is connected to the client 130 via the external network 125. The host 2 includes MSE 2, a distributed middlebox instance 140, and the client VM 1. The host 3 includes MSE 3, a distributed middlebox instance 145, and the client VM 2. The host 4 includes MSE 4 and the server VM 1. The host 5 includes MSE5 and the server VM 3. The host 6 includes MSE 6 and the server VMs 2 and 4.

The MSEs 1-6 implement the logical switches 1-3 and the logical router 115 in a distributed manner. That is, the MSEs 1-6 of some embodiments collectively perform data forwarding operations of the logical switches 1-3 and the logical router 115. Specifically, the ports (not shown) of the logical switches 1-3 are mapped to physical ports (e.g., virtual interfaces (VIFs)—not shown) of the MSEs 1-6. The VMs that send and receive data to and from the logical switches 1-3 through the ports of the logical switches actually send and receive the data to and from the MSEs through the physical ports of the MSEs to which the logical ports are mapped. The MSEs have forwarding tables (not shown) that includes the physical forwarding plane data in the form of flow entries. In some embodiments, a flow entry includes a qualifier and an action. The qualifier specifies a condition which, when met, directs the MSE to perform the action. The MSEs perform the data forwarding operations of the logical switching elements (logical switches and logical routers) according to the actions specified in the flow entries. Forwarding tables and flow entries will be described further below by reference to FIGS. 8-12.

The MSE that receives data from a VM is referred to as a first-hop MSE with respect to that data. In some embodiments, the first-hop MSEs perform all or most of the logical processing that are to be performed on the received data in order for the data to reach the data's destination. For instance, when the logical switch 1 receives a data packet from the client VM 1 that is addressed to get to the server VM 1, the logical switch 1 forwards the packet to the logical router 115. The logical router 115 then routes the packet to the logical switch 2, which will forward the packet to the server VM 1. In the physical network 110, the MSE 2 is the first-hop MSE with respect to this packet and performs logical processing to send the packet to server VM 1, which is connected to the MSE 4. That is, the MSE 2 performs the forwarding operations of the logical switch 1, the logical router 115, and the logical switch 2 to send the packet from the client VM 1 to the server VM 1. Likewise, for packets from the client VM 2 to one of the server VMs 1-4, the MSE 3 as the first-hop MSE for these packets performs the forwarding operations of the logical switch 1, the logical router 115, and the logical switch 2.

The MSEs exchange data amongst themselves via tunnels established between them. These tunnels allow the data to be exchanged among the MSEs over the other network elements (not shown) of the physical network 110. In some embodiments, the network control system does not manage these other network elements of the physical network 110. These other network elements thus serve as switching fabric for the MSEs to use to exchange data. In this example, each of the MSEs 1-3 establishes a tunnel to each of the MSEs 1-6.

Different types of tunneling protocols are supported in different embodiments. Examples of tunneling protocols include control and provisioning of wireless access points (CAPWAP), generic route encapsulation (GRE), and GRE Internet Protocol Security (IPsec) among other types of tunneling protocols.

In some embodiments, the MSEs 1-6 are edge switching elements because these MSEs are considered to be at the 'edge' of the physical network 110. Being at the edge of the network means either (1) the MSEs directly interface with virtual machines to send and receive data to and from the virtual machines or (2) the MSEs connect the physical network 110 to another physical network (e.g., the external network 125) which may or may not be managed by the network control system. As shown, each of the MSEs 2-6 directly interfaces with at least one of the client VMs 1-2 and the server VMs 1-4. The MSE 1 interfaces the external network and functions as an integration element to facilitate data exchange between the network elements of the physical network 110 and the external network 125. The non-edge MSEs (not shown) may facilitate data exchange between the MSEs and/or other unmanaged switching elements (not shown) of the physical network 110.

The middlebox 120 in the logical network 105 is implemented in the physical network 110 in a distributed manner, too. In some embodiments, a distributed middlebox instance is running in the same host in which a MSE is running in order to provide the DNAT and load balancing service to the data forwarded by the MSE. For instance, the distributed middlebox instance 140 running in the host 2 provides the DNAT and load balancing service to the packets forwarded by the MSE 2. That is, the distributed middlebox instance 140 receives data packets from the MSE 2 and performs DNAT and load balancing operations on the packets. The distributed middlebox instance 140 then returns the packets back to the MSE 2 so that the packets can be forwarded to the destinations of the packets. Likewise, the distributed middlebox instances 135 and 145 running in the hosts 1 and 3, respectively, next to the MSEs 1 and 3, respectively, provide the middlebox service to the packets coming to and from the external network 125 and the client VM 3, respectively.

Figure 2:
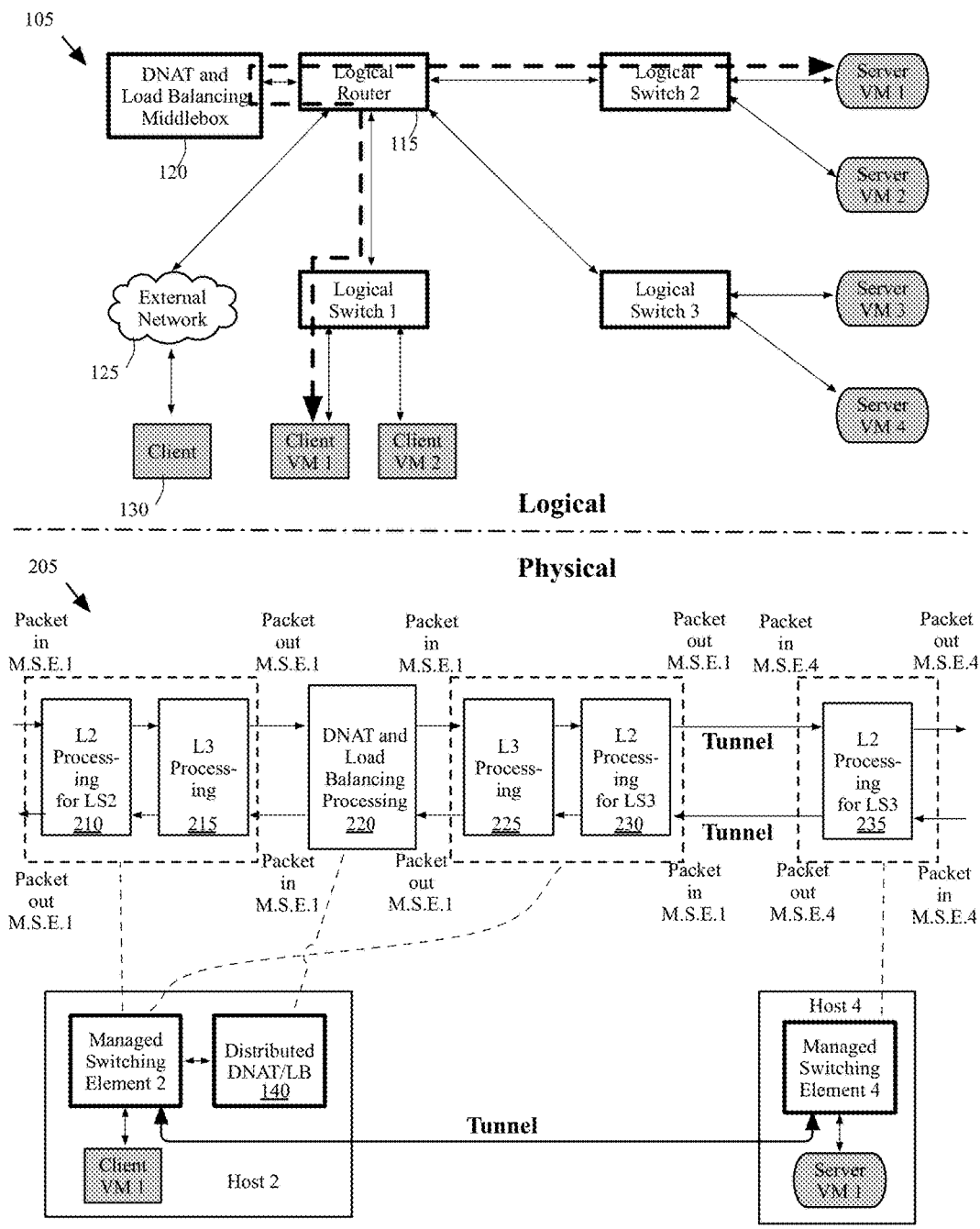
FIG. 2 illustrates a processing pipeline that is performed by the MSEs of some embodiments.

An example operation of the physical network 110 that implements the logical network 105 is now described by reference to FIG. 2. Specifically, FIG. 2 illustrates a processing pipeline 205 that is performed by the MSEs 2 and 4 and the distributed middlebox instance 140 in order to send a data packet from the client VM 1 to one of the server VMs 1-4 via the middlebox instance 140. FIG. 2 shows only the client VM 1 and the server VM 1, the logical switching elements, and hosts that are connected to or include the client VM 1 and the server VM 1 to illustrate data being sent by the client VM 1 is going to the server VM 1. The middlebox services that the middlebox 120 provides is DNAT and load balancing in this example.

When the client VM 1 that is coupled to the logical switch 1 sends a packet (not shown) that has a destination network address that is the virtual address for the server VMs 1-4, the packet is first sent to the MSE 2. The MSE 2 then performs L2 processing 210. The L2 processing 210 is a set of operations that define the logical switch 1's forwarding processing on the packet. By performing the L2 processing 210, the MSE 2 forwards the packet from the client VM 1 to the logical router 115. The packet is forwarded to the logical router 115 because the destination network address of the packet is not an address of a VM, data packets of which are handled by the logical switch 1. Thus, the packet has to be routed by the logical router 115 to another logical switch (or to the external network 125).

The MSE 2 then performs the L3 processing 215. The L3 processing 215 is a set of operations that define the logical router 115's routing of the packet. The logical router 115 routes the packet to the middlebox 120 to have the middlebox 120 to select one of the server VMs 1-4 and change the packet destination network address (e.g., destination IP address) to the address of the selected VM. By performing the L3 processing 215, the MSE 2 sends the packet to the distributed middlebox instance 140.

The distributed middlebox instance 140 which implements the middlebox 120 then performs DNAT and load balancing processing 220 on the packet. The distributed middlebox instance 140 of some embodiments periodically checks the health and load on the server VMs 1-4. The health of a server VM is information that indicates whether the server VM is alive to take service request and the load of the server VM is the amount of workload that the server VM is having. In this example, all four server VMs 1-4 are alive but the server VM 1 has the least amount of workload. More details about checking the health and load on the servers will be described further below by reference to FIG. 3. The distributed middlebox instance 140 changes the packet's destination IP address, which is the virtual IP address of the server VMs, into the real IP address of the selected server VM. In other embodiments, the distributed middlebox instance 140 creates flow entries and installs the flow entries in the forwarding table (not shown) of the MSE 2 so that when the distributed middlebox instance 140 sends a packet back to the MSE 2, this packet's destination IP address is changed by the MSE 2 based on those flow entries installed by the distributed middlebox instance 140. Creating and installing flow entries will be described further below by reference to FIGS. 8 and 11.

The MSE 2 then receives the packet sent from the distributed middlebox instance 140 and performs L3 processing 225 and L2 processing 230 on this packet. This packet has the real IP address of the server VM 1 as the destination IP address. The L3 processing 225 is a set of operations that define the logical router 115's routing of the packet. By performing the L3 processing 225, the MSE 2 routes the packet from the middlebox 140 to the logical switch 2, to which the server VM 1 is coupled.

The MSE 2 then performs L2 processing 230. The L2 processing 230 is a set of operations that define the logical switch 2's forwarding processing on the packet. By performing the L2 processing 230, the MSE 2 forwards the packet from logical router 115 to the server VM 1. However, because the server VM 1 is not physically coupled to the MSE 2, the MSE 2 has to identify a MSE to which the server VM 1 is coupled. The MSE 2 identifies the MSE 4 (e.g., through address learning process) and sends the packet to the MSE 4 over the tunnel established between the MSEs 2 and 4.

In some embodiments, the MSE 4 performs L2 processing 235, which defines a portion of the set of operations that define the logical switch 2's forwarding processing on the packet. For instance, the MSE 4 performs an egress access control list (ACL) processing on the packet before forwarding the packet to the server VM 1. In other embodiments, the MSE 2 does not perform the L2 processing 230 nor the L3 processing 215. That is, the MSE 4 will perform all L2 processing for the logical switch 2.

When the server VM 1 sends a packet to the client VM 1 in response to receiving a packet from the client VM 1, the MSE 4, the distributed middlebox instance 140, and the MSE 2 perform the processing pipeline 205 in the reverse order. Because most or all of the logical processing was performed by the MSE 2 for the packet that went to the server VM 1 from the client VM 1, most or all of logical processing for the response packet from the server VM 1 to the client VM 1 is also performed in the MSE 2. Having the MSE 2 to perform most or all of logical processing on the packets going both ways between the client VM 1 and the server VM 1, some embodiments avoid sharing state information (e.g., original and translated destination IP addresses mapping) between the MSEs 2 and 4. More detailed example operations of the MSEs 2 and 4 will be described further below by reference to FIGS. 8-12.

B. Maintaining Updated Health and Load Information of Servers

Figure 3:
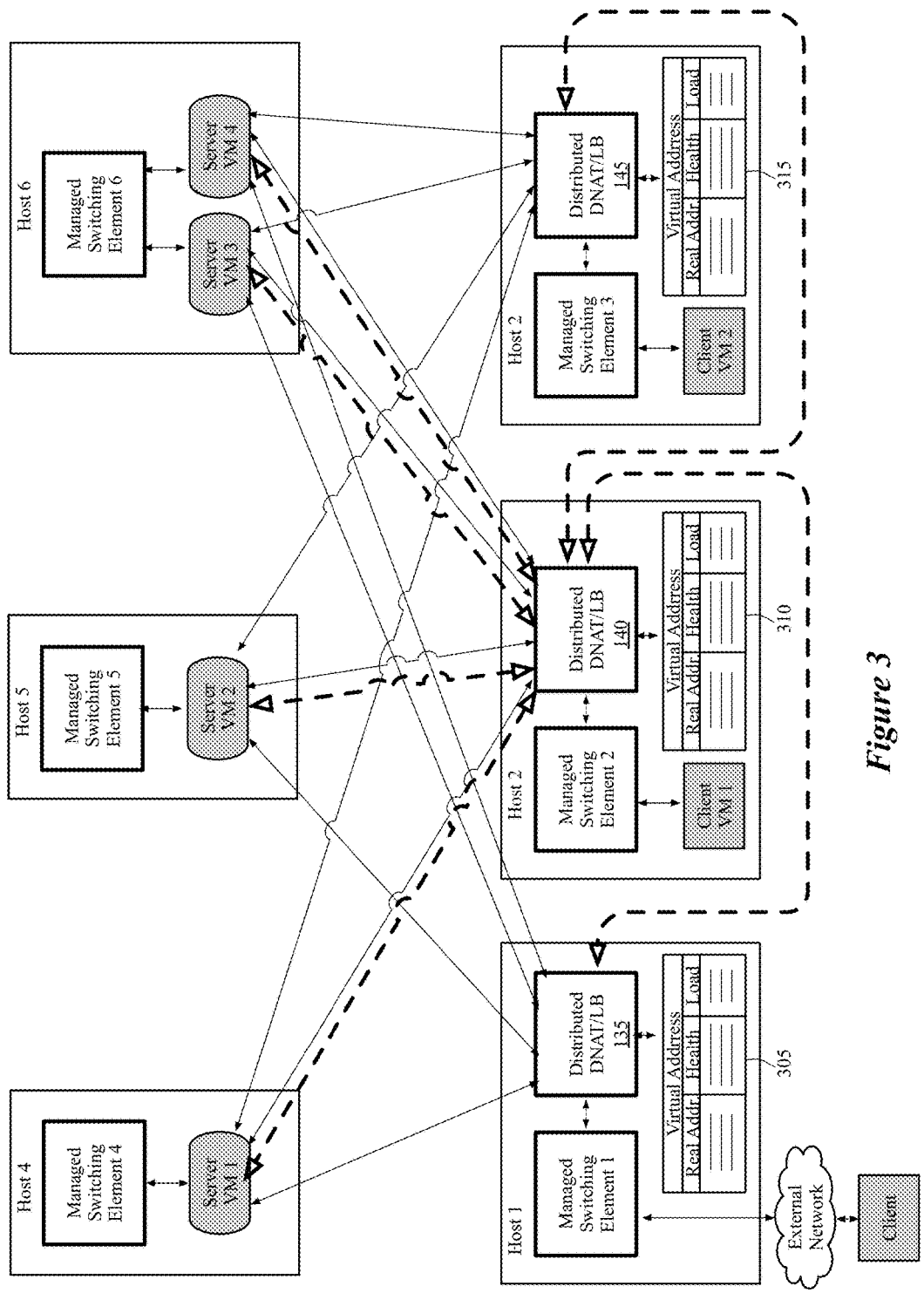
FIG. 3 conceptually illustrates several different schemes that the distributed middlebox instances use to check the health and load of the servers.

FIG. 3 conceptually illustrates several different schemes that the distributed middlebox instances use to check the health and load of the servers. Specifically, this figure illustrates that the distributed middlebox instances 135, 140, and 145 obtains the health and load information of the server VMs 1-4. This figure illustrates solid arrowed lines to represent one of the schemes that the distributed middlebox instances 135-145 use to obtain the health and load information of the server VMs 1-4. The thick dotted arrowed lines are depicted in this figure to represent another scheme that the distributed middlebox instances 135-145 use to obtain the health and load information of the server VMs 1-4.

In some embodiments, a middlebox that provides load balancing service maintains the health and load information of the servers over which the middlebox is load-balancing. These servers are behind a single network address so that the clients can send service requests addressed to this single network address. In some embodiments, the middlebox of some embodiments has a table such as a table 305 that lists the real network addresses of the servers and health and load status of the servers. Also, the middlebox maintains a list of virtual addresses. Each virtual address represents a group of servers over which the middlebox is to load-balance.

In some embodiments, the middlebox periodically checks the health status of the servers by sending probing messages. For instance, the middlebox may obtain the health information of the servers by using TCP keepalive messages. The middlebox configures the parameters of the TCP keepalive message, which include the frequency of sending keepalive messages (e.g., every ten minutes, every two hours, etc.), the number of times to retransmit keepalive messages when acknowledgement does not come back from the servers before declaring the receiving server is not available, etc.

The middlebox of some embodiments changes the status of a server unavailable or down when the server is found unavailable. In some embodiments, the middlebox obtains the load status from the servers by sending requests for the information periodically. Alternatively or conjunctively, the middlebox has the servers send the load status to the middlebox periodically.

As mentioned above, the middlebox is implemented in a distributed manner in some embodiments. A distributed middlebox instance implementing the middlebox provides the DNAT and load balancing service to the packets forwarded by the managed switching element that is running on the same host in which the distributed middlebox is running. The distributed middlebox instance then needs to have the health and load information of the servers in order to provide the load balancing service.

In some embodiments, each of the distributed middlebox instances that implement the middlebox, obtains the health and load information. As indicated by the thin arrowed lines depicted in FIG. 3, each of the distributed middlebox instances 135, 140, and 145 communicates with the server VMs 1-4 to obtain the information and updates their own tables 305, 310, and 315.

Alternatively or conjunctively, in some embodiments, one of the distributed middlebox instances that implement the middlebox obtains the health and load information and disseminates this information to the other distributed middlebox instances. The other distributed middlebox instances do not obtain the information directly from the servers. As indicated by the thick dotted arrowed lines depicted in this figure, the distributed middlebox instance 140 obtains the information from the server VMs 1-4 and provides this information to the distributed middlebox instances 135 and 145. In some embodiments, the distributed middlebox instance 140 send the updates on its own table 310 to the distributed middlebox instances 135 and 145 whenever the distributed middlebox instance 140 updates the table 310. The distributed middlebox instances 135 and 145 updates their own tables 305 and 315 with the received updates to keep the health and load information in their tables current.

In some embodiments, more than one distributed middlebox instances obtain and disseminate the health and load information. In some such embodiments, a first distributed middlebox instance gets the health and status information from a first set of servers and a second distributed middlebox instance gets the information from a second set of servers that does not overlap with the first set of servers. For instance, the distributed middlebox instance 135 may get the health and load information from the server VMs 1 and 2 and disseminates this information to the distributed middlebox instances 140 and 145. The distributed middlebox instance 145 may get the health and load information from the server VMs 3 and 4 and disseminates this information to the distributed middlebox instances 135 and 140.

C. Configuring MSEs and Middleboxes

As described above, the MSEs of some embodiments implement logical switches and logical routers based on flow entries supplied to the MSEs by the network control system. The network control system of some embodiments is a distributed control system that includes several controller instances that allow the system to accept logical datapath sets from users and to configure the MSEs to implement these logical datapath sets (i.e., datapath sets defining the logical switching elements of the users). The distributed control system also receives middlebox configuration data from the users and configures the distributed middlebox instances by sending the configuration data to the distributed middlebox instances. These controller instances of the distributed control system form a cluster and thus the network control system is referred to as a controller cluster.

Figure 4:
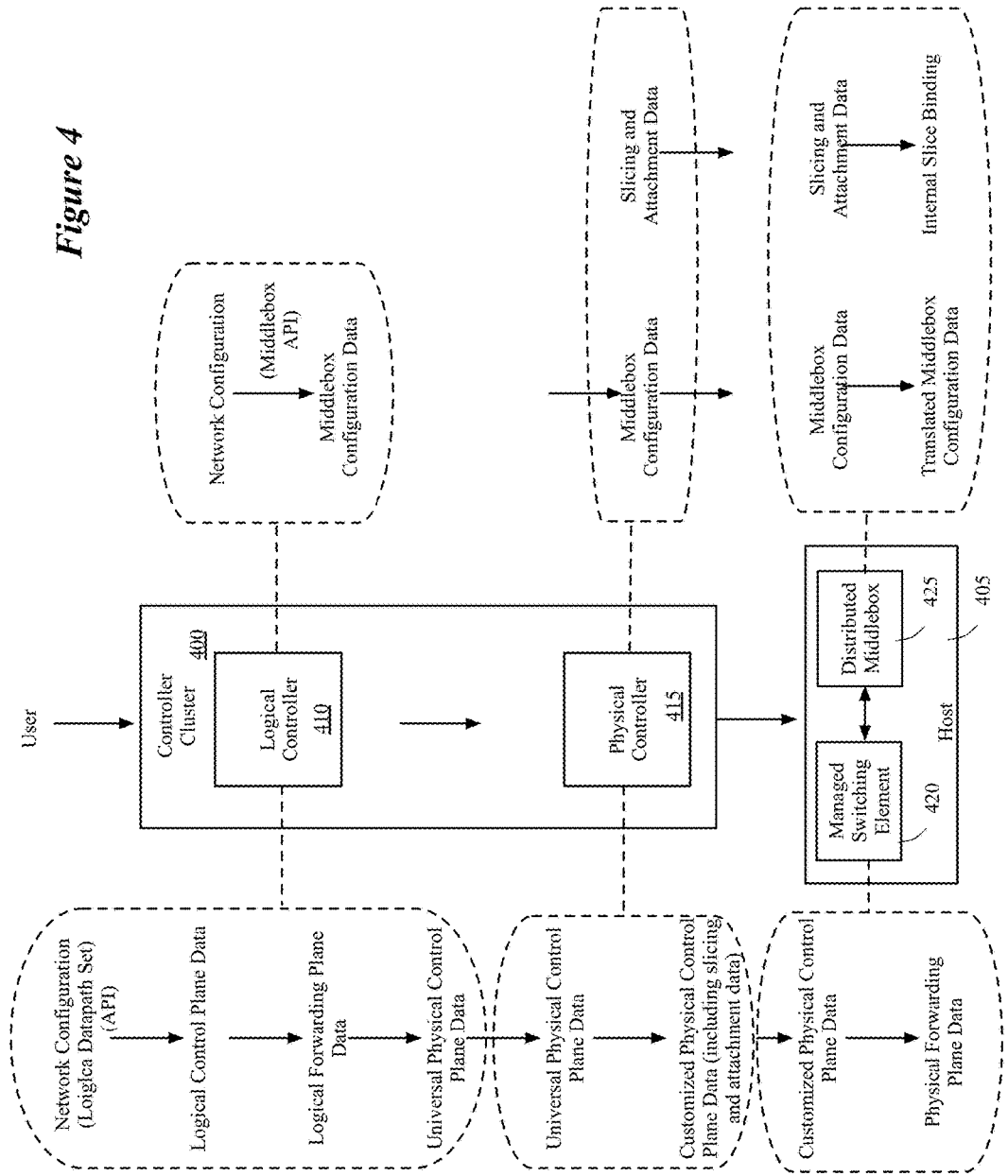
FIG. 4 illustrates an example controller cluster.

FIG. 4 illustrates an example controller cluster 400. The controller cluster 400 configures and manages several MSEs and several distributed middlebox instances running in several hosts. This figure illustrates only the controller cluster 400 and a host 405. The controller cluster 400 includes a logical controller 410 and a physical controller 415. The logical controller 410 and the physical controller are two of many controllers (not shown) of the controller cluster 400.

In some embodiments, the logical controller 410 is a device (e.g., a general-purpose computer) that executes one or more modules that transform the user input from a LCP to a LFP, and then transform the LFP data to universal physical control plane data. These modules in some embodiments include a control module and a virtualization module (not shown). A control module allows a user to specify and populate a logical datapath set, while a virtualization module implements the specified logical datapath set by mapping the logical datapath set onto the physical switching infrastructure.

As shown on the left side of the logical controller 410, the logical controller 410 of some embodiments receives logical datapath set data from a user in a form of application protocol interface (API) calls that are supported by the logical controller 410. The API (not shown) of the logical controller 410 translates the logical datapath set data for configuring logical switches and logical routers into LCP data. The LCP data is the control plane data for the logical switching elements (e.g., logical switches and logical routers) that the user is managing through the controller cluster. The logical controller 410 generates LFP data from the LCP data. The LFP data is the forwarding plane data for the logical switching elements of the user. In some embodiments, the logical controller 410 has a set of modules (not shown) including a translation engine that translates the LCP data into the LFP data. In some such embodiment, the translation performed by the translation engine involves database table mapping.

From the LFP data for a particular logical datapath set of the user, the virtualization module of the logical controller 410 of some embodiments generates universal physical control plane (UPCP) data that is the control plane data for any MSE that implements the logical datapath set. The UPCP data does not include specifics of the MSEs (e.g., information that is local to the MSE such as a port number, etc.). In some embodiments, the translation engine translates the LFP data into UPCP data.

The set of modules of the logical controller 410 also includes a module that identifies a set of physical controllers that is responsible for controlling a set of MSEs that implement the logical datapath set (i.e., that implement the logical switching elements of the user). The logical controller 410 sends the UPCP data only to the identified set of physical controllers in some embodiments. The logical controller of different embodiments communicates with the physical controllers differently. For instance, in some embodiments, the logical controller 410 establishes a communication channel (e.g., a remote procedure call (RPC) channel) with each of the physical controllers in the identified set. Alternatively or conjunctively, the logical controller and the physical controller use a storage as a medium of communication by placing and pulling UPCP data in the storage.

The physical controller 415 is one of the physical controllers of the controller cluster 400. The physical controller 415 is responsible for managing the MSE 420. The physical controller 415 receives the UPCP data from the logical controller 410 and converts the UPCP data into customized physical control plane (CPCP) data for the MSE 420. In contrast to the UPCP data, the CPCP data for a MSE includes the specifics of the MSE. The CPCP data is the control plane data for the MSE. In some embodiments, the physical controller 415 has a set of modules (not shown) including a translation engine that translates the UPCP data into the CPCP data. In some such embodiment, the translation performed by the translation engine involves database table mapping.

The CPCP data includes the attachment data, which defines the coupling of the managed switching element and the distributed middlebox instance that implement the logical switching elements (the logical switches and the logical routers) of the user. For instance, the attachment data specifies the port number of a port of the MSE, through which the MSE and the distributed middlebox instance exchange packets.

The physical controller 415 also sends slicing data to the MSE. Slicing data in some embodiments include identifiers for identifying different "slices" of a distributed middlebox instance. In some embodiments, a distributed middlebox instance may provide a middlebox service to several different VMs that belong to several different users (i.e., several different logical domains). The distributed middlebox may be "sliced" so that each slice of the distributed middlebox instance provides the middlebox service to VMs of one user having one logical nework. When the managed switching element that forwards packets for the VMs sends packets to the distributed middlebox instance, the MSE uses the slice identifiers to indicate to which particular user or logical domain that a packet belongs so that the slice for the particular user processes the packet.

In some embodiments, the slicing data includes a binding between a long-form slice identifier and a short-form slice identifier. The long-form slice identifier is relatively long (e.g., 128 bits) and the short-form slice identifier is relatively short (e.g., 16 bits). In some embodiments, the long-term slice identifier is used to make an identity of a user unique across the numerous MSEs that might be implementing numerous users' logical domains. The short-form slice identifier is used for packet exchange between a MSE and a distributed middlebox instance running in a host.

The user also configures the middlebox service for the user's logical switching elements. As shown on the right side of the controller cluster 400, the logical controller 410 of some embodiments includes a middlebox API for taking API calls specifying the configuration of the middlebox service (e.g., DNAT rules, list of server VMs, virtual network addresses for groups of server VMs, health and load information obtaining schemes described above by reference to FIG. 3, etc.) from the user. The middlebox API of the logical controller 410 extracts the configuration data from the middlebox API calls received from the user and sends the configuration data to the same set of physical controllers to which the logical controller 410 sends the UPCP data.

The physical controller 415 of some embodiments receives the configuration data from the logical controller 410 and then relays the configuration data to all MSEs that the physical controller 415 manages. These MSEs, including the MSE 420, implement at least part of the user's logical switching elements. The MSE 420 then sends this configuration data to the distributed middlebox instance 425. Alternatively or conjunctively, the physical controller 415 directly sends the middlebox configuration data to the distributed middlebox instance 425.

In some embodiments, the physical controller 415 also sends the slicing data and the attachment data to the distributed middlebox instances that the physical controller manages. The distributed middlebox instance 425 performs translation of the configuration data using the slicing and attachment data to complete the configuration of the distributed middlebox instance 425 as specified by the user. The distributed middlebox instance also creates a binding of slicing data. Specifically, the distributed middlebox instance of some embodiments creates a binding between short-form slice identifiers and internal slice identifiers to use only within the distributed middlebox instance 425. An example usage of the internal slice identifiers may be for populating a data structure that allows only certain lengths for the slice identifiers to have.

Each of the controllers illustrated in FIG. 4 is shown as a single controller. However, each of these controllers may actually be a controller cluster that operates in a distributed fashion to perform the processing of a logical controller or physical controller.

Figure 5:
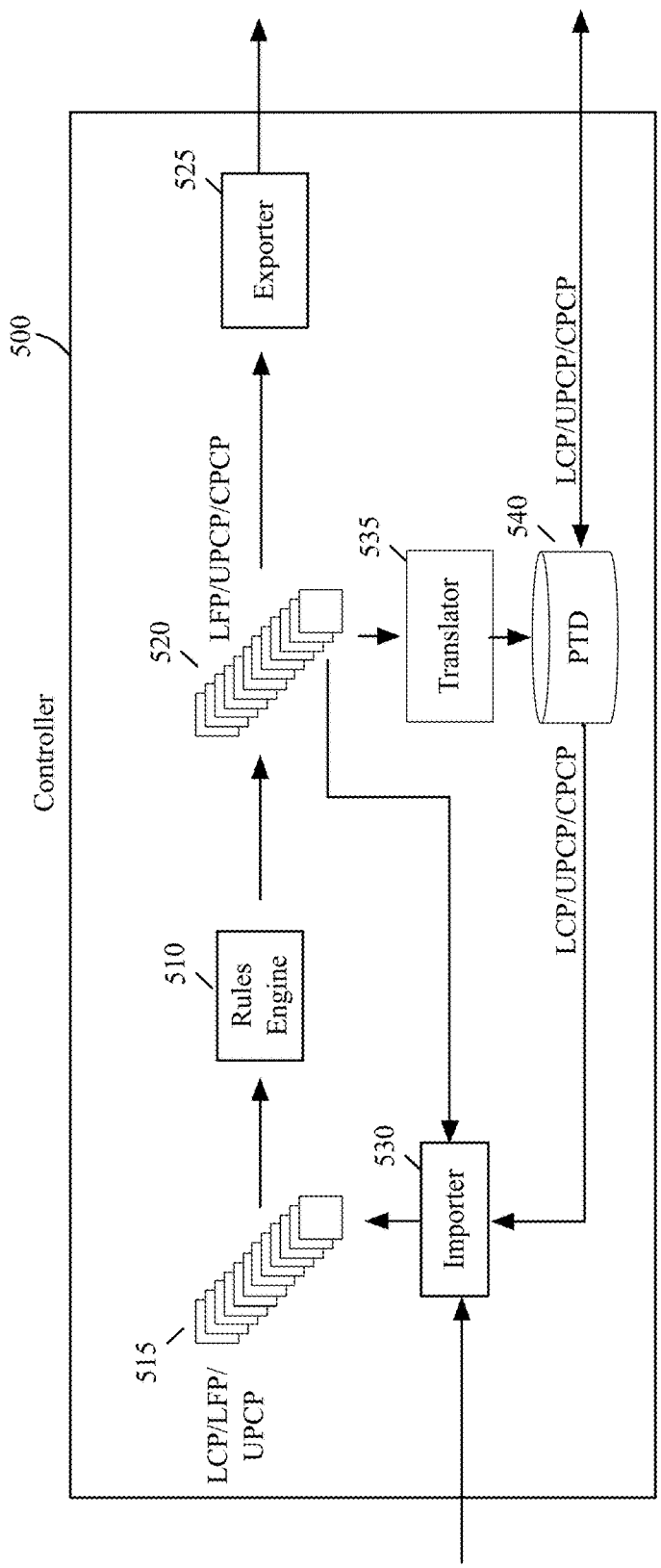
FIG. 5 illustrates example architecture of a network controller.

FIG. 5 illustrates example architecture of a network controller (e.g., a logical controller or a physical controller) 500. The network controller of some embodiments uses a table mapping engine to map data from an input set of tables to data in an output set of tables. The input set of tables in a controller include LCP data to be mapped to LFP data, LFP data to be mapped to UPCP data, and/or UPCP data to be mapped to CPCP data. The input set of tables may also include middlebox configuration data to be sent to another controller and/or a distributed middlebox instance. The network controller 500, as shown, includes input tables 515, an rules engine 510, output tables 520, an importer 530, an exporter 535, a translator 535, and a persistent data storage (PTD) 540.

In some embodiments, the input tables 515 include tables with different types of data depending on the role of the controller 500 in the network control system. For instance, when the controller 500 functions as a logical controller for a user's logical forwarding elements, the input tables 515 include LCP data and LFP data for the logical forwarding elements. When the controller 500 functions as a physical controller, the input tables 515 include LFP data. The input tables 515 also include middlebox configuration data received from the user or another controller. The middlebox configuration data is associated with a logical datapath set parameter that identifies the logical switching elements to which the middlebox to be is integrated.

In addition to the input tables 515, the control application 500 includes other miscellaneous tables (not shown) that the rules engine 510 uses to gather inputs for its table mapping operations. These miscellaneous tables tables include constant tables that store defined values for constants that the rules engine 510 needs to perform its table mapping operations (e.g., the value 0, a dispatch port number for resubmits, etc.). The miscellaneous tables further include function tables that store functions that the rules engine 510 uses to calculate values to populate the output tables 525.

The rules engine 510 performs table mapping operations that specifies one manner for converting input data to output data. Whenever one of the input tables is modified (referred to as an input table event), the rules engine performs a set of table mapping operations that may result in the modification of one or more data tuples in one or more output tables.

In some embodiments, the rules engine 510 includes an event processor (not shown), several query plans (not shown), and a table processor (not shown). Each query plan is a set of rules that specifies a set of join operations that are to be performed upon the occurrence of an input table event. The event processor of the rules engine 510 detects the occurrence of each such event. In some embodiments, the event processor registers for callbacks with the input tables for notification of changes to the records in the input tables 515, and detects an input table event by receiving a notification from an input table when one of its records has changed.

In response to a detected input table event, the event processor (1) selects an appropriate query plan for the detected table event, and (2) directs the table processor to execute the query plan. To execute the query plan, the table processor, in some embodiments, performs the join operations specified by the query plan to produce one or more records that represent one or more sets of data values from one or more input and miscellaneous tables. The table processor of some embodiments then (1) performs a select operation to select a subset of the data values from the record(s) produced by the join operations, and (2) writes the selected subset of data values in one or more output tables 520.

Some embodiments use a variation of the datalog database language to allow application developers to create the rules engine for the controller, and thereby to specify the manner by which the controller maps logical datapath sets to the controlled physical switching infrastructure. This variation of the datalog database language is referred to herein as nLog. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping rules engine that is referred to as the nLog engine.

Some embodiments designate the first join operation that is performed by the rules engine for an input event to be based on the logical datapath set parameter. This designation ensures that the rules engine's join operations fail and terminate immediately when the rules engine has started a set of join operations that relate to a logical datapath set (i.e., to a logical network) that is not managed by the controller.

Like the input tables 515, the output tables 520 include tables with different types of data depending on the role of the controller 500. When the controller 500 functions as a logical controller, the output tables 515 include LFP data and UPCP data for the logical switching elements. When the controller 500 functions as a physical controller, the output tables 520 include CPCP data. Like the input tables, the output tables 515 may also include the middlebox configuration data. Furthermore, the output tables 515 may include a slice identifier when the controller 500 functions as a physical controller.

In some embodiments, the output tables 520 can be grouped into several different categories. For instance, in some embodiments, the output tables 520 can be rules engine (RE) input tables and/or RE output tables. An output table is a RE input table when a change in the output table causes the rules engine to detect an input event that requires the execution of a query plan. An output table can also be an RE input table that generates an event that causes the rules engine to perform another query plan. An output table is a RE output table when a change in the output table causes the exporter 525 to export the change to another controller or a MSE. An output table can be an RE input table, a RE output table, or both an RE input table and a RE output table.

The exporter 525 detects changes to the RE output tables of the output tables 520. In some embodiments, the exporter registers for callbacks with the RE output tables for notification of changes to the records of the RE output tables. In such embodiments, the exporter 525 detects an output table event when it receives notification from a RE output table that one of its records has changed.

In response to a detected output table event, the exporter 525 takes each modified data tuple in the modified RE output tables and propagates this modified data tuple to one or more other controllers or to one or more MSEs. When sending the output table records to another controller, the exporter in some embodiments uses a single channel of communication (e.g., a RPC channel) to send the data contained in the records. When sending the RE output table records to MSEs, the exporter in some embodiments uses two channels. One channel is established using a switch control protocol (e.g., OpenFlow) for writing flow entries in the control plane of the MSE. The other channel is established using a database communication protocol (e.g., JSON) to send configuration data (e.g., port configuration, tunnel information).

In some embodiments, the controller 500 does not keep in the output tables 520 the data for logical datapath sets that the controller is not responsible for managing (i.e., for logical networks managed by other logical controllers). However, such data is translated by the translator 535 into a format that can be stored in the PTD 540 and is then stored in the PTD. The PTD 540 propagates this data to PTDs of one or more other controllers so that those other controllers that are responsible for managing the logical datapath sets can process the data.

In some embodiments, the controller also brings the data stored in the output tables 520 to the PTD for resiliency of the data. Therefore, in these embodiments, a PTD of a controller has all the configuration data for all logical datapath sets managed by the network control system. That is, each PTD contains the global view of the configuration of the logical networks of all users.

The importer 530 interfaces with a number of different sources of input data and uses the input data to modify or create the input tables 510. The importer 520 of some embodiments receives the input data from another controller. The importer 520 also interfaces with the PTD 540 so that data received through the PTD from other controller instances can be translated and used as input data to modify or create the input tables 510. Moreover, the importer 520 also detects changes with the RE input tables in the output tables 530.

II. Load Balancing and DNAT

In some embodiments, the middlebox services that a middlebox can provide include a DNAT service and a load balancing service. When a middlebox provides the DNAT service, the middlebox replaces the destination network address (e.g., the destination IP address) of a packet with a different destination network address, in order to hide the real address of the destination from the sender of the packet while allowing the packet to reach the destination. When a middlebox provides the load balancing service, the middlebox selects one of the servers represented by a single virtual address and replaces the destination network address of a packet with the real network address of the selected server. In some embodiments, the middlebox provides both these services.

Figure 6:
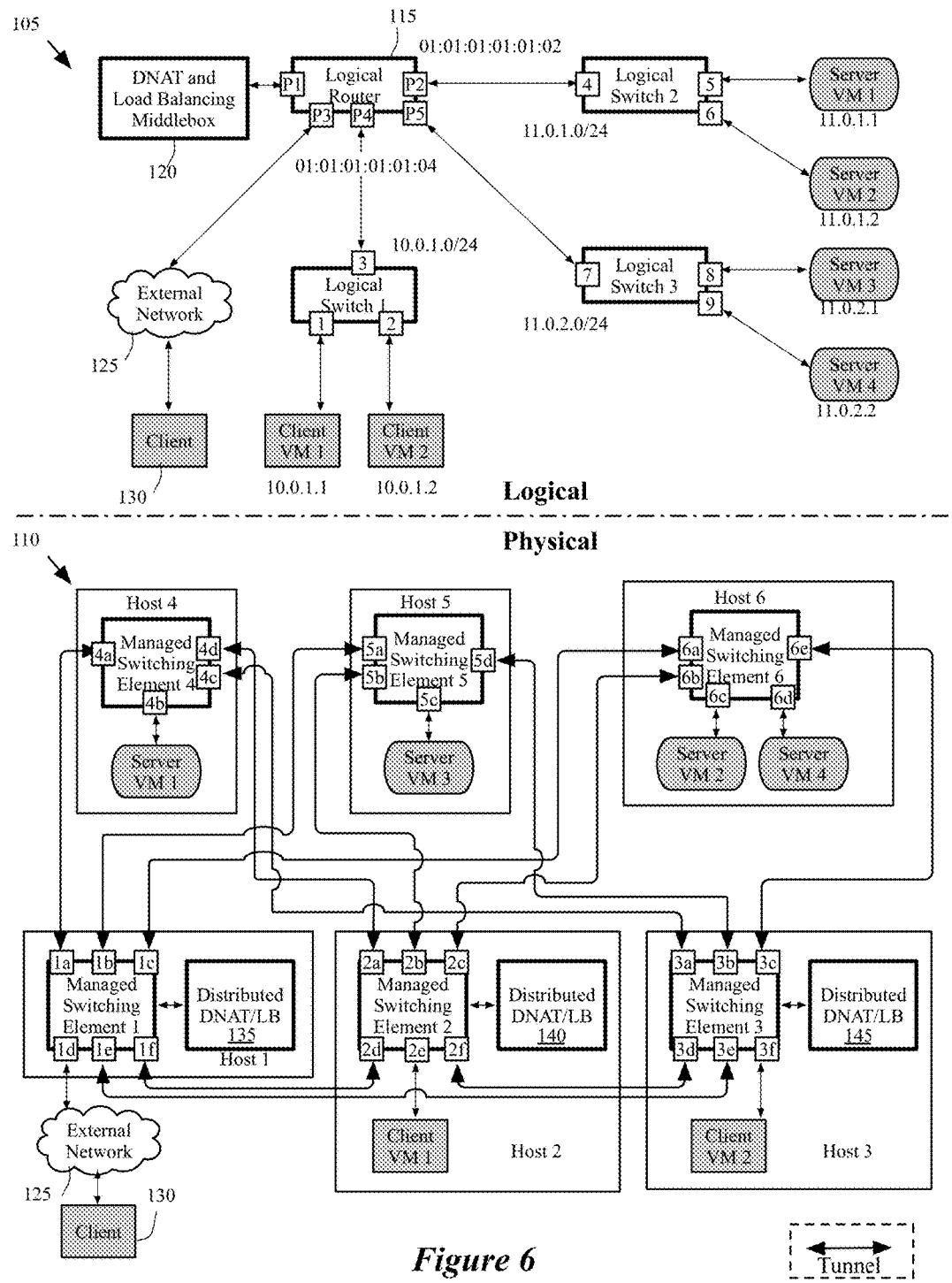
FIG. 6 illustrates a logical network and a physical network.

FIG. 6 illustrates the logical network 105 and the physical network 110 that is described above by reference to FIG. 1. Specifically, FIG. 6 illustrates the elements of the logical network 105 and the physical network 110 with ports. The description of these ports will be used in the description of the later figures, FIG. 7-12.

As shown, the logical switch 1 has three ports, ports 1-3. Port 1 is associated with the client VM 1's L2 address (e.g., a MAC address). Port 2 is associated with the client VM 2's L2 address. Port 3 is associated with the MAC address of port P4 of the logical router 115. The logical switch 2 has three ports 4-6. Port 4 is associated with the MAC address of port P2 of the logical router 115. In this example, the MAC address of port P4 is 01:01:01:01:01:04 and the MAC address of port 2 is 01:01:01:01:01:02.

The logical router has five ports, P1-P5. Port P1 is coupled to the middlebox 120. Port P2 is coupled to port 4 of the logical switch 2. Port P3 is coupled to the external network 125. Port P4 is coupled to port 3 of the logical switch 1. Port P5 is coupled to port 7 of the logical switch 3. In this example, the logical switch 1 forwards packets between VMs that have IP addresses that belong to a subnet IP address of 10.0.1.0/24. Port P4 of the logical router 115 is therefore associated with a subnet IP address of 10.0.1.0/24. In this example, the logical switch 2 forwards packets between VMs that have IP addresses that belong to a subnet IP address of 11.0.1.0/24. Port P2 is therefore associated with a subnet IP address of 11.0.1.0/24. In this example, the logical switch 3 forwards packets between VMs that have IP addresses that belong to a subnet IP address of 11.0.2.0/24. Port P5 is therefore associated with a subnet IP address of 11.0.2.0/24.

The client VM 1 has an IP address of 10.0.1.1 and the client VM 2 has an IP address of 10.0.1.2. The server VM 1 has an IP address of 11.0.1.1 and the server VM 2 has an IP address of 11.0.1.2 in this example. Also, The server VM 3 has an IP address of 11.0.2.1 and the server VM 4 has an IP address of 11.0.2.2 in this example. The server VMs 1-4 are represented as a single server VM having an IP address of 10.0.2.1 in this example.

Port P1 of the logical router 115 is for sending packets to the middlebox 120 and is not associated with any IP subnet in this example. In some embodiments, a port of the MSE that the MSE uses to communicate with the distributed middlebox instance (e.g., port P1) is a port that does not have a physical port (e.g., VIF) to which the port is mapped.

Shown in the bottom half of FIG. 6, the MSE 1 has ports 1a-1f. The MSE 2 has ports 2a-2f. The MSE 3 has ports 3a-3f. The MSE 4 has ports 4a-4d. The MSE 5 has ports 5a-5d. The MSE 6 has ports 6a-6e. In this example, the tunnel that is established between the MSEs 2 and 4 terminates at ports 2a and 4d.

Port 1d of the MSE 1 is mapped to port P3 of the logical router 115. Port 2e of the MSE 2 is mapped to port 1 of the logical switch 1 and therefore port 2e is associated with the MAC address of the client VM 1. Port 3f of the MSE 3 is mapped to port 2 of the logical switch 1 and therefore port 3f is associated with the MAC address of the client VM 2. Port 4b of the MSE 4 is mapped to port 5 of the logical switch 2 and therefore port 4b is associated with the MAC address of the server VM 1. Port 5c of the MSE 5 is mapped to port 8 of the logical switch 3 and therefore port 5c is associated with the MAC address of the server VM 3. Port 6c of the MSE 6 is mapped to port 6 of the logical switch 2 and therefore port 6c is associated with the MAC address of the server VM 2. Port 6d of the MSE 6 is mapped to port 9 of the logical switch 3 and therefore port 6d is associated with the MAC address of the server VM 4.

A. Distributed Middlebox Instance with DNAT Service

Figure 7:
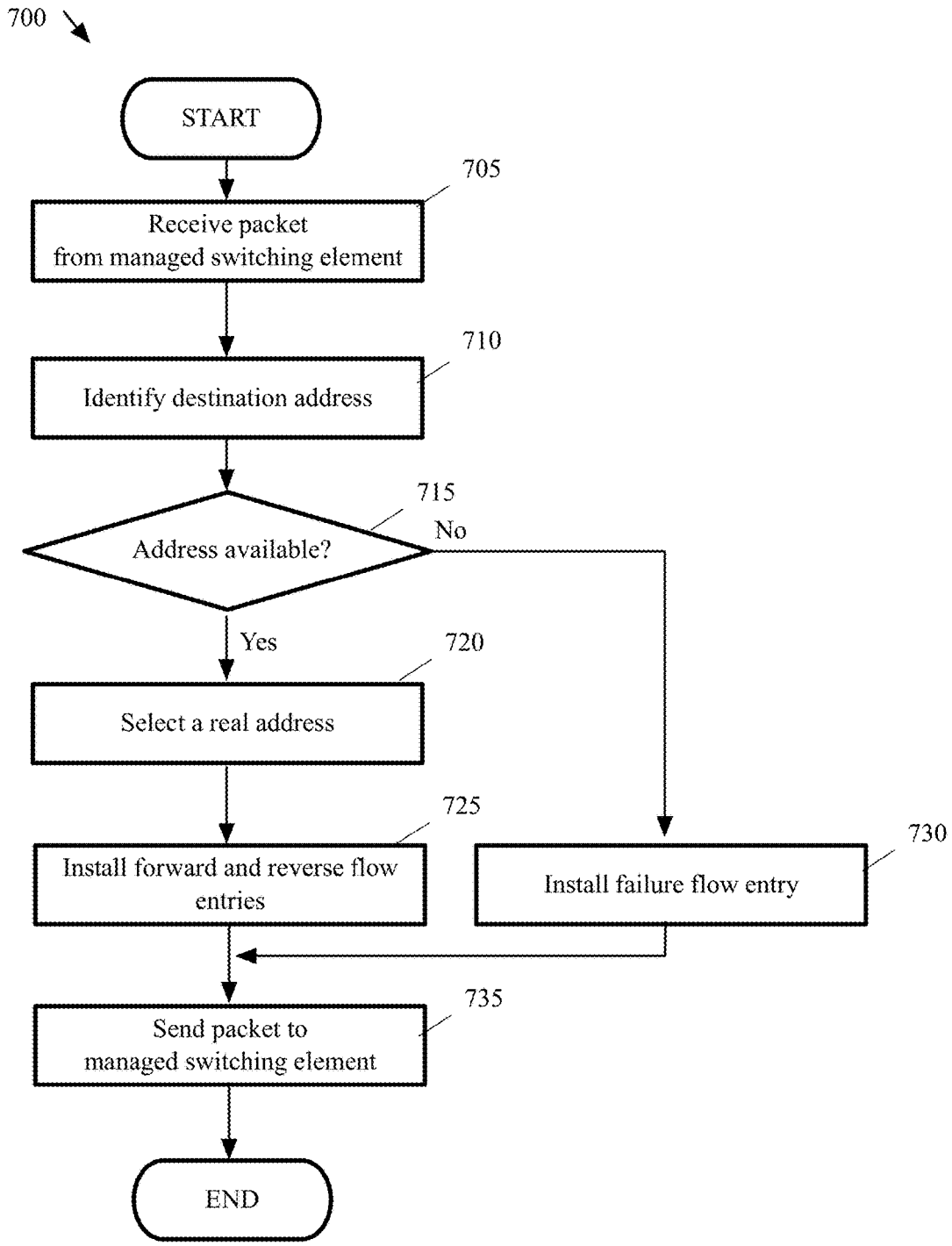
FIG. 7 conceptually illustrates a process that some embodiments perform to provide DNAT and load balancing service.

FIG. 7 conceptually illustrates a process 700 that some embodiments perform to provide DNAT and load balancing service. In some embodiments, the process 700 is performed by a distributed middlebox instance in order to translate destination network addresses of the packets that the MSE, which is running in the same host in which the distributed middlebox instance runs, processes as a first-hop MSE. The distributed middlebox instance of some embodiments receives flow templates along with the packets, which are flow entries that are missing some actual values. In these embodiments, the distributed middlebox provides the DNAT and load balancing service by creating flow entries by filling in the flow templates with actual values and installing the created flow entries in the flow tables of the first-hop MSE. The distributed middlebox also sends the packets back to the first-hop MSE so that the packets are processed by the MSE based on the flow entries installed by the distributed middlebox instance.

The process 700 begins by receiving (at 705) a packet and several flow templates from a MSE that is a first-hop MSE with respect to this packet. That is, the MSE sending the packet has received the packet from a source VM with which the MSE directly interfaces. This packet's destination IP address is the virtual IP address representing a set of server VMs. The packet has the IP address of the source VM as the source IP address.

Next, the process 700 identifies (at 710) the destination IP address of the received packet so that the process can translate this address into another IP address. The process 700 then determines (at 715) whether there is an available IP address into which the process can translate the destination IP address of the packet. In some embodiments, the process 700 maintains a set of virtual IP addresses, each representing a set of server VMs that collectively act as a single server providing the same service. The process 700, for each virtual IP address the process maintains, has a list of real IP addresses of the set of servers. The process also maintains the health and load information of each of the set of servers. In some embodiments, when none of the servers are available, the process 715 determines that no address is available into which to translate the destination IP address.

When the process 700 determines (at 715) that there is no available address into which to translate the destination IP address of the packet, the process 700 creates (at 730) and installs a failure flow entry. In some embodiments, the process 700 creates the failure flow entry by filling in a received (at 705) flow template with an instruction to drop the packet. The MSE will drop the packet according to the failure flow entry. The process 700 then proceeds to 735, which will be described further below.

When the process 700 determines (at 715) that there are available addresses (available servers) into which to translate the destination IP address of the packet, the process 715 selects (at 720) one of the available addresses. In some embodiments, the process selects the address of a server that has the least amount of workload when the process performs load balancing. Different embodiments determine the amount of workload that a server at a given moment has differently. For instance, the amount of workload of a server may be determined based on available computational resources (e.g., CPU cycles, memory, etc.) that the server at the given moment has. Also, some embodiments determine the workload based on the number of clients that the server is serving at the given moment.

Next at 725, the process 700 creates and installs forward flow entry and reverse flow entry. A forward flow entry is a flow entry that directs the first-hop MSE to modify the packet by replacing the destination IP address with the selected real address (i.e., real address of the selected server). In some embodiments, the process 700 creates the forward flow entry by filling in a received (at 705) flow template with the selected real address. A reverse flow entry is a flow entry that directs the first-hop MSE to modify a response packet that is sent from the destination of the initial packet (i.e., the packet that is sent to the destination) in response to receiving the initial packet. The response packet will have a source IP address, which is the IP address to which the destination IP address of the initial packet is translated. The first-hop MSE translates the source IP address of the response packet so that the response packet is correctly recognized by client VM of the initial packet. The client VM would not be able to recognize the packet from the server when the response packet does not have the virtual IP address representing the server.

Next, the process 700 sends (at 735) the packet back to the first-hop MSE. The process 700 then ends. The first-hop MSE will process the packet based on the flow entries, which will include the forward and reverse flow entries and/or the failure flow entry.

The specific operations of these process 700 may not be performed in the exact order shown and described. The specific operations may not be performed in one continuous series of operations, and different specific operations may be performed in different embodiments. Furthermore, the process could be implemented using several sub-processes, or as part of a larger macro process.

B. First-Hop Processing of the First Packet

Figure 8:
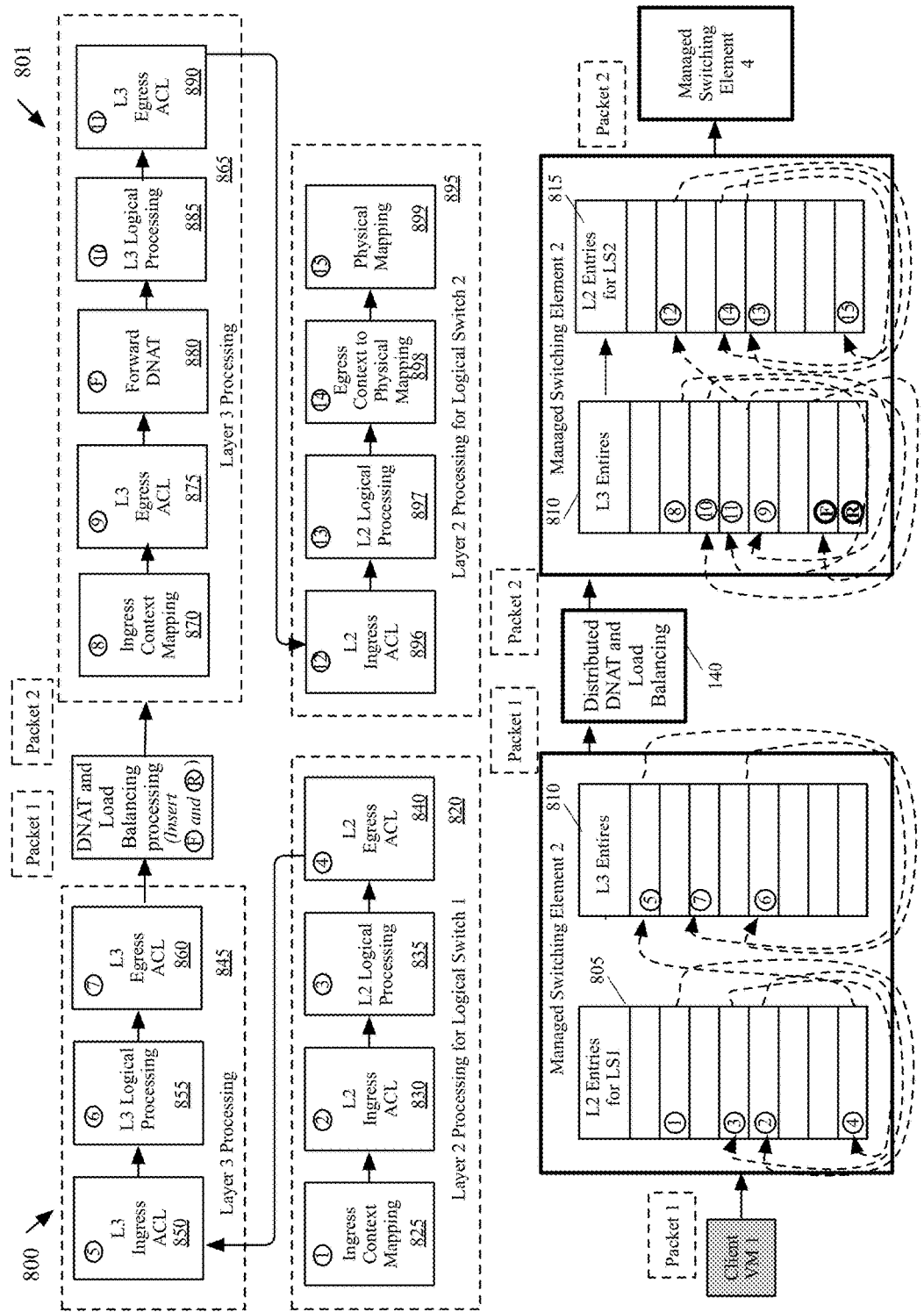
FIG. 8 conceptually illustrates an example operation of a MSE that is a first-hop MSE with respect to a data packet.

FIG. 8 conceptually illustrates an example operation of a MSE that is a first-hop MSE with respect to a data packet. Specifically, this figure illustrates an operation of the MSE 2 that processes a packet from the client VM 1 to the server VM 1. In this example, the packet is the very first packet that is sent from the client VM 1 to the server VM 1. This figure also illustrates the operation of a distributed middlebox instance that receives the packet from the first-hop MSE to provide DNAT and load balancing service. Specifically, the top half of this figure illustrates two processing pipelines 800 and 801 that are performed by the MSE 2. The processing pipeline 800 includes L2 processing 820 for the logical switch 1 and L3 processing 845 for the logical router 115, which have stages 825-840 and stages 850-860, respectively. The processing pipeline 801 includes L3 processing 865 for the logical router 115 and L2 processing 895 for the logical switch 2, which have stages 870-890 and stages 896-899, respectively.

The bottom half of the figure illustrates the MSEs 2 and 4, and the client VM 1. As shown, the MSE 2 includes a table 805 for storing flow entries for the logical switch 1 (not shown), a table 810 for storing flow entries for the logical router 115, and a table 815 for storing flow entries for the logical switch 2. Although these tables are depicted as separate tables, the tables do not necessarily have to be separate tables. That is, a single table may include all the flow entries for the MSE 2 to use to perform the logical processing of the logical router 115 and the logical switches 1 and 2.

When the client VM 1 that is coupled to the logical switch 1 sends packet 1 to the server VM 1 that is coupled to the logical switch 2, the packet is first sent to the MSE 2 through port 2a of the MSE 2. The MSE 2 performs an L2 processing 820 on packet 1 based on the forwarding tables 805 of the MSE 2. In this example, packet 1 has a destination IP address of 10.0.2.1, which is the virtual IP address of the server VMs 1-4 as described above by reference to FIG. 6. Packet 1's source IP address is 10.0.1.1. Packet 1 also has the client VM 1's MAC address as a source MAC address and the MAC address of port P4 (01:01:01:01:01:04) of the logical router 115 as a destination MAC address.

The MSE 2 identifies a flow entry indicated by an encircled 1 (referred to as "record 1") in the forwarding table 805 that implements the context mapping of the stage 825. The record 1 identifies packet 1's logical context based on the ingress port, which is port 2e through which packet 1 is received from the client VM 1. In addition, the record 1 specifies that the MSE 2 stores the logical context of packet 1 in a set of fields (e.g., a VLAN id field) of packet 1's header. In some embodiments, a logical context represents the state of the packet with respect to the logical switching element. For example, some embodiments of the logical context may specify the logical switching element to which the packet belongs, the port of the logical switching element through which the packet was received, the port of the logical switching element through which the packet is to be transmitted, the stage of the LFP of the logical switching element the packet is at, etc.

The record 1 also specifies packet 1 is to be further processed by the forwarding tables (e.g., by sending packet 1 to a dispatch port). A dispatch port (not shown) is a port of a MSE to send the processed packet back to the ingress port of the MSE so that the MSE can further process the packet.

Based on the logical context and/or other fields stored in packet 1's header, the MSE 2 identifies a flow entry indicated by an encircled 2 (referred to as "record 2") in the forwarding tables that implements the ingress ACL of the stage 830. In this example, the record 2 allows packet 1 to be further processed and, thus, specifies packet 1 is to be further processed by the MSE 2. In addition, the record 2 specifies that the MSE 2 stores the logical context (i.e., packet 1 has been processed by the stage 830) of packet 1 in the set of fields of packet 1's header.

Next, the MSE 2 identifies, based on the logical context and/or other fields stored in packet 1's header, a flow entry indicated by an encircled 3 (referred to as "record 3") in the forwarding tables that implements the logical L2 forwarding of the stage 835. The record 3 specifies that a packet with the MAC address of port P4 of the logical router 115 as a destination MAC address is to be sent to port 3 of the logical switch 1.

The record 3 also specifies that packet 1 is to be further processed by the MSE 2. Also, the record 3 specifies that the MSE 2 stores the logical context (i.e., packet 1 has been processed by the third stage 835) in the set of fields of packet 1's header.

Next, the MSE 2 identifies, based on the logical context and/or other fields stored in packet 1's header, a flow entry indicated by an encircled 4 (referred to as "record 4") in the forwarding tables that implements the egress ACL of the stage 840. In this example, the record 4 allows packet 1 to be further processed (e.g., packet 1 can get out of the logical switch 1 through port 3 of the logical switch 1) and, thus, specifies packet 1 is to be further processed by the MSE 2 (e.g., by sending packet 1 to the dispatch port). In addition, the record 4 specifies that the MSE 2 stores the logical context (i.e., packet 1 has been processed by the stage 840 of the processing pipeline 800) of packet 1 in the set of fields of packet 1's header. (It is to be noted that all records specify that a MSE updates the logical context store in the set of fields whenever the MSE performs some portion of logical processing based on a record.)

The MSE 2 continues processing packet 1 based on the flow entries. The MSE 2 identifies, based on the logical context and/or other fields stored in packet 1's header, a flow entry indicated by an encircled 5 (referred to as "record 5") in the L3 entries 810 that implements L3 ingress ACL of the logical router 115 by specifying that the MSE 2 should accept the packet through port P4 of the logical router 115 based on the information in the header of packet 1. The record 5 also specifies that packet 1 is to be further processed by the MSE 2 (e.g., by sending packet 1 to a dispatch port). In addition, the record 5 specifies that the MSE 2 stores the logical context (i.e., packet 1 has been processed by the stage 850 of the processing pipeline 800) of packet 1 in the set of fields of packet 1's header.

The MSE 2 then identifies a flow entry indicated by an encircled 6 (referred to as "record 6") in the L3 entries table 810 implements the L3 routing 855 by specifying that a packet received through port P4 of the logical router 115 and having a virtual IP address of 10.0.2.1 as a destination IP address is to be sent to the middlebox 120 through port P1. That is, the record 6 specifies that a packet having a source IP address that belongs to the subnet IP address of 10.0.1.0/24 and having a destination IP address of 10.0.2.1 is to be sent to the middlebox 120. Because packet 1 has the source IP address 10.0.1.1 that belongs to the subnet IP address of 10.0.1.0/24 and has the destination IP address 10.0.2.1, the MSE 2 will send the packet to the distributed middlebox instance 140.

The MSE 2 then identifies a flow entry indicated by an encircled 7 (referred to as "record 7") in the L3 entries 810 that implements L3 egress ACL 860 by specifying that the MSE 2 allows the packet to exit out through port P1 of the logical router 115 based on the information (e.g., source IP address) in the header of packet 1. In addition, the record 7 specifies that the MSE 2 removes the logical context of packet 1 from the set of fields of packet 1's header. The MSE 2 sends packet 1 to the distributed middlebox instance 140, which implements the middlebox 120. The record 7 also specifies that several flow templates are to be sent to the middlebox 120 along with packet 1. The managed switching element 1 of some embodiments also sends a slice identifier to the distributed middlebox instance 140 so that the slice of the distributed middlebox instance 140 for the user of the logical switching elements in the logical network 1 processes packet 1.

Upon receiving packet 1, the distributed middlebox instance 140 identifies an IP address into which to translate the destination IP address (10.0.2.1) of packet. In some embodiments, the distributed middlebox instance 140 looks up the table 305 (described above by reference to FIG. 3) to find a server VM that has the least amount of workload. In this example, such server VM is the server VM 1. Thus, the distributed middlebox instance 140 selects 11.0.1.1, which, as described above by reference to FIG. 6, is the real IP address of the server VM 1. The distributed middlebox instance 140 also creates a forward flow entry that specifies that the MSE 2 modifies a packet that has a source IP address of 10.0.1.1 and a destination IP address of 10.0.2.1 by replacing the destination IP address (10.0.2.1) with the selected IP address (11.0.1.1). The distributed middlebox instance 140 also creates a reverse flow entry that specifies that the MSE 2 modifies a packet with a source IP address of 11.0.1.1 and a destination IP address of 10.0.1.1 by replacing the source IP address of this packet with the virtual IP address (10.0.2.1). The reverse flow entry ensures that a response packet from the server VM 1 reaches the correct destination, the client VM 1. The distributed middlebox 140 installs the created flow entries and sends packet 1 back to the MSE 2. In some embodiments, the MSE 2 treats the packet returned from the distributed middlebox instance 140 as a new packet to route. Thus, this new packet is referred to as packet 2 in this example. As shown, the forward and reverse flow entries are installed (e.g., placed) in the table 810 indicated by encircled F and R, respectively.

Upon receiving packet 2, the MSE 2 performs the L3 processing 865 on packet 2 based on the table 810. In this example, because packet 2 is still the same as packet 1, packet 2 has a destination IP address of 10.0.2.1, which is the virtual IP address of the server VMs 1-4. Packet 2's source IP address is still 10.0.1.1. The MSE 2 identifies a flow entry indicated by an encircled 8 (referred to as "record 8") in the forwarding table 810 that implements the context mapping of the stage 870. The record 1 identifies packet 2's logical context based on the ingress port, which is port P1 through which packet 2 is received from the middlebox 120. In addition, the record 8 specifies that the MSE 2 stores the logical context of packet 2 in a set of fields (e.g., a VLAN id field) of packet 2's header. The record 8 also specifies packet 2 is to be further processed by the MSE 2 (e.g., by sending packet 2 to a dispatch port).

The MSE 2 continues processing packet 2 based on the flow entries. The MSE 2 identifies, based on the logical context and/or other fields stored in packet 2's header, a flow entry indicated by an encircled 9 (referred to as "record 9") in the L3 entries 810 that implements L3 ingress ACL 875 of the logical router 115 by specifying that the MSE 2 should accept the packet through port P1 of the logical router 115 based on the information in the header of packet 2. The record 9 also specifies that packet 2 is to be further processed by the MSE 2. In addition, the record 9 specifies that the MSE 2 stores the logical context (i.e., packet 2 has been processed by the stage 875 of the processing pipeline 801) of packet 2 in a set of fields of packet 2's header.

In some embodiments, the flow entries have associated priority levels. The priority levels are used to select one of several flow entries when a packet satisfies the conditions specified by the qualifiers of the several flow entries. The MSE 2 identifies a flow entry indicated by an encircled F (referred to as "record F") in the L3 entries table 810. The record F is the forward flow entry that the distributed middlebox instance has created and installed in the table 810. Packet 2 meets the condition specified in the record F as well as the condition specified in the record 6 because packet 2's destination IP address is 10.0.2.1 that is specified as a condition in the record F and packet 2's source IP address belongs to the subnet IP address of 10.0.1.0/24 specified as a condition in the record 6. In some embodiments, the record F that is created by the distributed middlebox instance has a priority level that is higher than that of the record 6, which directs the MSE 2 to send the packet to the distributed middlebox instance 140. In addition, the record F specifies that the MSE 2 stores the logical context (i.e., packet 1 has been processed by the stage 880 of the processing pipeline 801) of packet 2 in the set of fields of packet 2's header.

The MSE 2 then identifies a flow entry indicated by an encircled 10 (referred to as "record 10") in the L3 entries 810 that implements L3 routing 885 by specifying that packet 2 with its destination IP address (11.0.1.1) should exit out of port P2 of the logical router 115. The record 10 also specifies that packet 2 is to be further processed by the MSE 2. In addition, the record 10 specifies that the MSE 2 stores the logical context (i.e., packet 2 has been processed by the stage 880 of the processing pipeline 801) of packet 2 in a set of fields of packet 2's header.

The MSE 2 then identifies a flow entry indicated by an encircled 11 (referred to as "record 11") in the L3 entries 810 that implements L3 egress ACL 890 by specifying that the MSE 2 allows the packet to exit out through port P2 of the logical router 115 based on the information (e.g., source IP address) in the header of packet 2. Also, the record 11 (or another record in the routing table, not shown) indicates that the source MAC address for packet 2 is to be rewritten to the MAC address of port P2 of the logical router 115 (01:01:01:01:01:02). Record 11 may also specify that the MSE 2 resolves the destination IP address of packet 2 in order to obtain the MAC address of the server VM 1. In some embodiments, the MSE 2 uses address resolution protocol (ARP) to resolve the destination IP address into the MAC address of the destination. Record 11 may specify that the MSE 2 replaces the destination MAC address of the packet (currently the MAC address of port 3 of the MSE 2) with the MAC address of the server VM 1 to which the destination IP address has been resolved. In addition, the record 11 specifies that the MSE 2 stores the logical context (i.e., packet 2 has been processed by the stage 890 of the processing pipeline 801) of packet 2 in the set of fields of packet 2's header.

Packet 2 has exited the logical router 115 through port P2 and has entered the logical switch 2 through port 4 of the logical switch 2. The MSE 2 then performs L2 processing 895. Based on the logical context and/or other fields stored in packet 2's header, the MSE 2 identifies a flow entry indicated by an encircled 12 (referred to as "record 12") in the L2 entries 815 that implements the ingress ACL of the stage 896. In this example, the record 12 specifies that packet 2 is to be further processed by the MSE 2. In addition, the record 12 specifies that the MSE 2 stores the logical context (i.e., packet 1 has been processed by the stage 896 of the processing pipeline 801) of packet 1 in the set of fields of packet 2's header.

Next, the MSE 2 identifies, based on the logical context and/or other fields stored in packet 1's header, a flow entry indicated by an encircled 13 (referred to as "record 13") in the L2 entries 815 that implements the logical L2 forwarding of the stage 897. The record 13 specifies that a packet with the MAC address of the server VM 1 as the destination MAC address should be forwarded through port 5 of the logical switch 2 that is connected to the server VM 1. The record 13 also specifies that packet 2 is to be further processed by the MSE 2. Also, the record 13 specifies that the MSE 2 stores the logical context (i.e., packet 2 has been processed by the stage 897 of the processing pipeline 801) in the set of fields of packet 2's header.

Based on the logical context and/or other fields stored in packet 2's header, the MSE 2 identifies a flow entry indicated by an encircled 14 (referred to as "record 14") in the L2 entries 815 that implements the context mapping of the stage 898. In this example, the record 14 identifies the MSE 4 as the MSE to which the packet exiting port 5 of the logical switch 2 should be sent. The record 14 additionally specifies that packet 2 be further processed by the MSE 2. In addition, the record 14 specifies that the MSE 2 stores the logical context (i.e., packet 2 has been processed by the stage 898 of the processing pipeline 801) of packet 2 in the set of fields of packet 2's header.

Based on the logical context and/or other fields stored in packet 2's header, the MSE 2 then identifies a flow entry indicated by an encircled 15 (referred to as "record 15") in the L2 entries 815 that implements the physical mapping of the stage 899. The record 15 specifies port 2a of the MSE 2 as a port through which packet 2 is to be sent in order for packet 2 to reach the MSE 4. In this case, the MSE 2 is to send packet 2 out of port 2a of MSE 2 that is coupled to the MSE 4 through a tunnel. In addition, the record 15 specifies that the MSE 2 stores the logical context (i.e., packet 2 has been processed by the stage 899 of the processing pipeline 801) of packet 2 in the set of fields of packet 2's header.

B. First-Hop Processing of the Subsequent Packets

Figure 9:
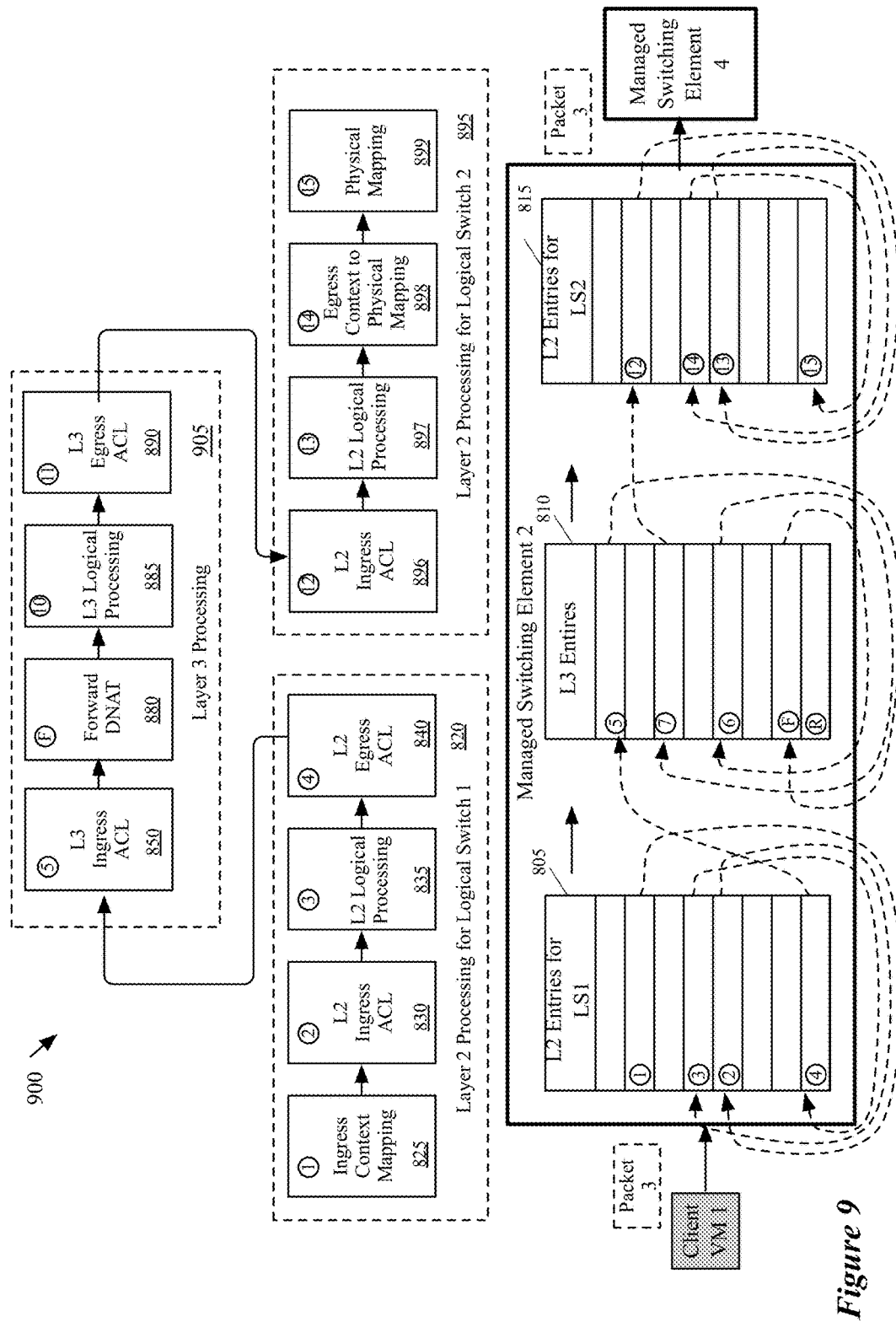
FIG. 9 conceptually illustrates an example operation of a MSE that is a first-hop MSE with respect to a data packet.

FIG. 9 conceptually illustrates an example operation of a MSE that is a first-hop MSE with respect to a data packet. Specifically, this figure illustrates an operation of the MSE 2 that processes a packet from the client VM 1 to the server VM 1. In this example, the packet is one of the packets that are being sent from the client VM 1 to the server VM 1 after the very first packet that has been sent from the client VM 1 to the server VM 1. This subsequent packet has the same source and destination IP addresses, 10.0.1.1 and 10.0.2.1, respectively, because the packet is being sent from the same source (the client VM 1) to the same destination (the virtual IP address 10.0.2.1) as the first packet. The top half of this figure shows a processing pipeline 900 that the MSE performs on this packet. The processing pipeline 900 includes the L2 processing 820 for the logical switch 1, L3 processing 905 for the logical router 115, and the L2 processing 895 for the logical switch 2. The L3 processing 905 has the stages 850, 880, 885, and 890.

As shown in FIGS. 8 and 9, the difference between the processing of the very first packet (packet 1) and the processing a subsequent packet (packet 3) by the MSE 2 is that the MSE 2 does not send the subsequent packet to the distributed middlebox instance 140. This is because after the stage 850 is performed according to the record 5, the MSE 2 goes with the record F rather than the record 6, which would have directed the MSE 2 to send the subsequent packet to the distributed middlebox instance. As described above by reference to FIG. 8, the record F (i.e., the forward flow entry created and installed by the distributed middlebox instance 140) has a higher priority level than the record 6 has. This shows that only the first packet for establishing a connection between the source and the destination needs to be sent to the distributed middlebox instance and thus makes it faster to process the subsequent packets being sent from the source to the destination.

C. Processing Response Packets

As mentioned above, in some embodiments, a particular MSE that is a first-hop with respect to a particular packet performs all or most of the logical processing that is to be performed on the particular packet in order for the particular packet to reach the packet's destination. In some such embodiments, the particular MSE also performs all or most of the logical processing that is to be performed on a response packet that is sent from the destination of the particular packet in response to receiving the particular packet. By having the particular MSE perform the logical processing on the response packet, some embodiments avoid having to share state information (e.g., mapping between the logical switching element and the MSE, reverse flow entry, etc.) between MSEs. That is, had the first-hop MSE to the response packet performed the logical operation on the response packet, that MSE would need the state information in order to restore the original source IP address and send the response packet back to the origin of the particular packet.

Figure 10:
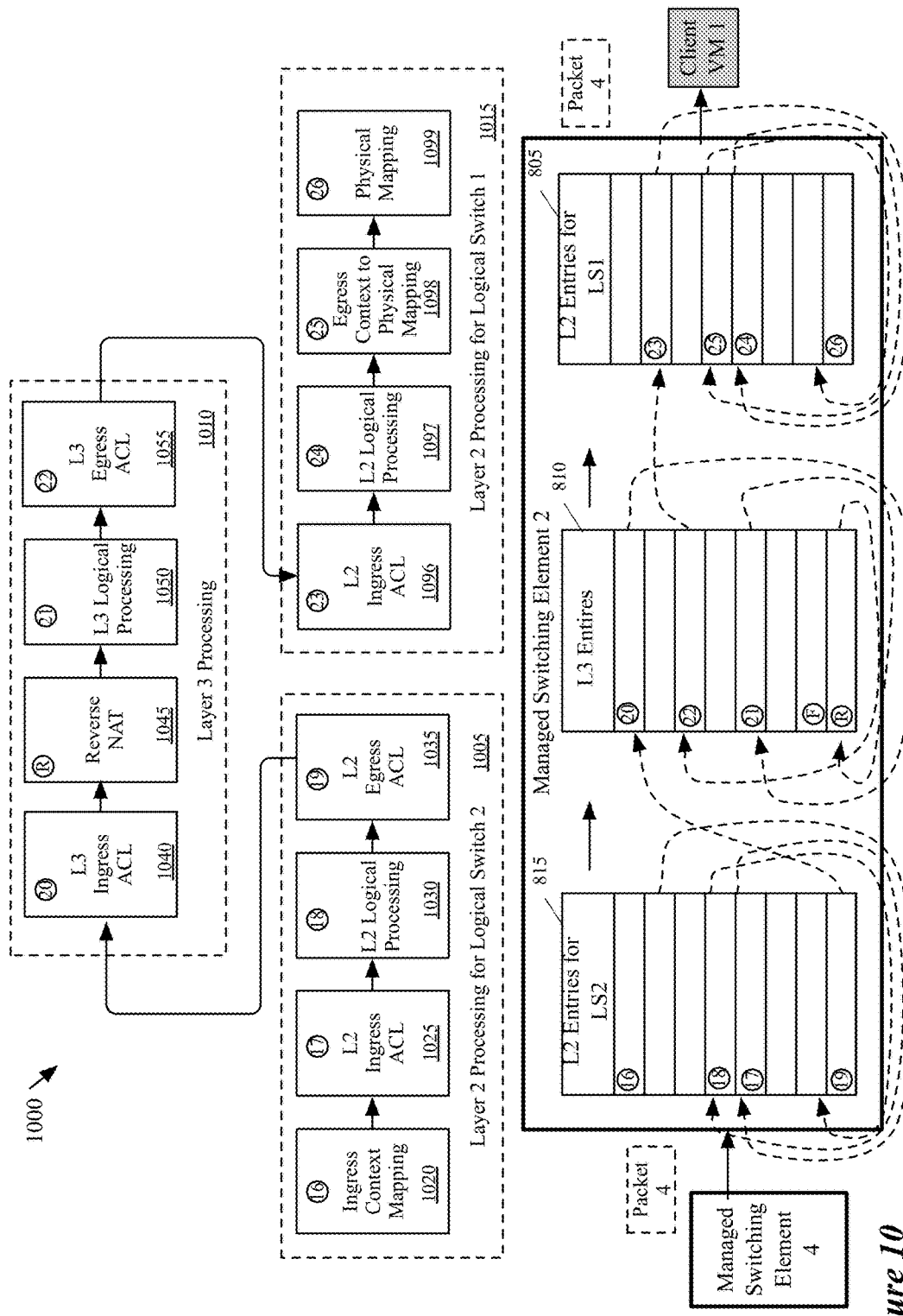
FIG. 10 conceptually illustrates an example operation of a MSE that is a first-hop MSE with respect to a particular packet and is a last-hop MSE with respect to a packet that is sent in response to receiving the particular packet.

FIG. 10 conceptually illustrates an example operation of a MSE that is a first-hop MSE with respect to a particular packet and is a last-hop MSE with respect to a packet that is sent in response to receiving the particular packet. Specifically, this figure illustrates an operation of the MSE 2 that processes a packet from the server VM 1 to the client VM 1. In this example, the server VM 1 has sent this packet to the client VM 1 in response to receiving a packet from the client VM 1. In other words, the response packet from the server VM 1 is part of a data stream originating from the server VM 1 and flowing into the client VM 1 over a connection (e.g., a transport layer connection like a TCP connection). This figure also illustrates that the response packets are not sent to the distributed middlebox instance 140 for translating the source IP addresses of the response packets into the virtual IP address of the server VMs 1-4. Instead, the MSE 2 performs that translation according to the reverse flow entry that is created and installed by the distributed middlebox instance 140 as described above by reference to FIG. 8.

The top half of FIG. 10 illustrates a processing pipeline 1000 that is performed by the MSE 2. The processing pipeline 1000 includes L2 processing 1005 for the logical switch 2, L3 processing 1010 for the logical router 115, and L2 processing 1015 for the logical switch 1, which have stages 1020-1035, stages 1040-1055, and stages 1096-1099, respectively. The bottom half of the figure illustrates the MSEs 2 and 4, and the client VM 1. As shown, the MSE 2 includes the tables 805, 810, and 815 for storing flow entries for the logical switch 1, the logical router 115, and the logical switch 2, respectively.

When the MSE 2 receives from the MSE 4 packet 4 that is originated from the server VM 1 through port 2*a* of the MSE, the MSE 2 performs the L2 processing 1005 to forward packet 4 from the server VM 1 to the logical router 115. The MSE 2 performs the L2 processing 1005 based on the flow entries indicated by encircled 16-19. Packet 4 has the destination IP address of 10.0.1.1 and has the server VM 1's real IP address 11.0.1.1 as the source IP address because packet 4 is a response packet to a packet that has the real IP address of the server VM 1 as the destination IP address.

The MSE 2 then performs the L3 processing 1010 to route the packet out of the logical router 115 through port P4 of the logical router 115. Specifically, based on the logical context and/or other fields stored in packet 4's header, the MSE 2 identifies a flow entry indicated by an encircled 20 (referred to as "record 20") in the forwarding tables that implements the L3 ingress ACL of the stage 1040. In this example, the record 20 allows packet 4 to be further processed and, thus, specifies that packet 4 is to be further processed by the MSE 2. In addition, the record 20 specifies that the MSE 2 stores the logical context (i.e., packet 1 has been processed by the stage 1040) of packet 4 in the set of fields of packet 4's header.

The MSE 2 then identifies the reverse flow entry indicated by encircled R (referred to as "record R"). As mentioned above, the reverse flow entry specifies that the MSE 2 modifies a packet with a source IP address of 11.0.1.1 by replacing the source IP address of this packet with the virtual IP address of the server VMs 1-4 (10.0.2.1).

The MSE 2 then identifies a flow entry indicated by an encircled 21 (referred to as "record 21") in the L3 entries 810 that implements L3 routing 1050 by specifying that packet 4 with its destination IP address (10.0.1.1) should exit out of port P4 of the logical router 115. Also, the record 21 (or another record in the routing table, not shown) indicates that the source MAC address for packet 4 is to be rewritten to the MAC address of port P4 of the logical router 115 (01:01:01:01:01:04).

The MSE 2 then identifies a flow entry indicated by an encircled 22 (referred to as "record 22") in the L3 entries 810 that implements the L3 egress ACL of stage 1055 by specifying that the MSE 1 allows the packet to exit out through port P4 of the logical router 115 based on the information (e.g., source IP address) in the header of packet 4. In addition, the record 22 specifies that the MSE 2 stores the logical context (i.e., packet 4 has been processed by the stage 1055 of the processing pipeline 1000) of packet 4 in the set of fields of packet 4's header.

The MSE 2 then performs the L2 processing 1015 for the logical switch 1 according to the flow entries indicated by encircled 23-26. The MSE will send packet 4 out of the logical switch 1 through port 1 of the logical switch. Because port 2*e* of the MSE 2 is mapped to port 1 of the logical switch 1, the MSE 2 will physically send out packet 1 to the client VM 1 through port 2*e* of the MSE 2.

D. Last-Hop Processing of the First and Subsequent Packets

Figure 11:
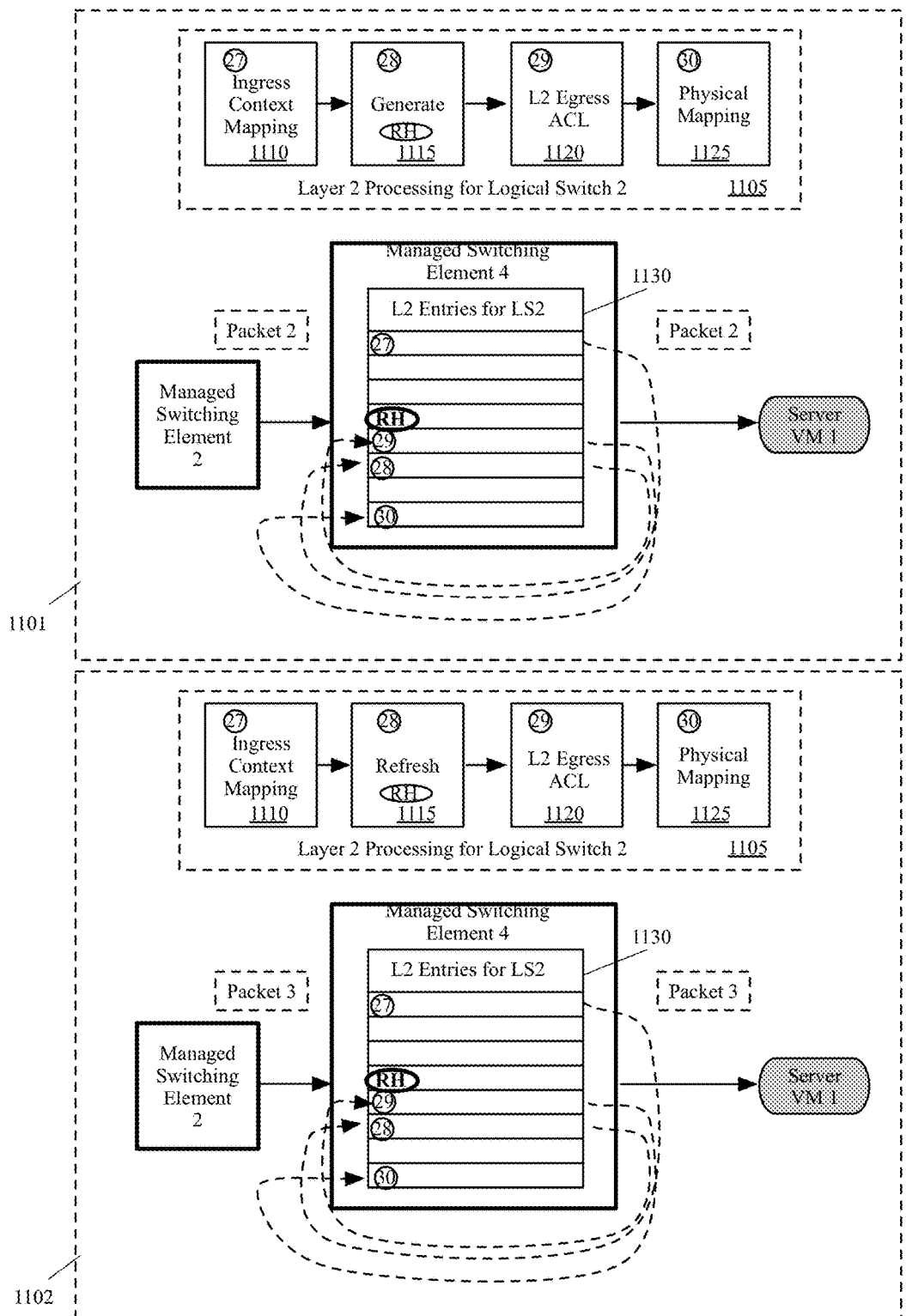
FIG. 11 conceptually illustrates example operations of a MSE that is a last-hop MSE with respect to packets.

FIG. 11 conceptually illustrates example operations of a MSE that is a last-hop MSE with respect to packets. That is, this MSE receives packets that are being sent to a destination with which this MSE is directly interfacing. Specifically, this figure illustrates, in terms of two cases 1101 and 1102, operations of the MSE 4 that processes a packet from the client VM 1 to the server VM 1. In the case 1101, the MSE 4 processes packet 2 that is the first packet going to the server VM 1 from the client VM 1. Packet 2 is the packet that the MSE 2 has processed as described above by reference to FIG. 8. In the case 1102, the MSE processes packet 3 that is one of the packets going to the server VM 1 from the client VM 1 after the first packet has reached the server VM 1. Packet 3 is the packet that the MSE 2 has processed as described above by reference to FIG. 9.

The top side of the case 1101 shows a processing pipeline 1105 that is performed by the MSE 4. The processing pipeline 1105 includes stages 1110-1125. The bottom side of the case 1101 shows the MSEs 2 and 4, and the server VM 1. As shown, the MSE 4 includes the table 1130 for storing flow entries for the logical switch 2.

When the MSE 4 receives from the MSE 2 packet 2 that is originated from the client VM 1 through port 4*d* of the MSE 4, the MSE 4 performs the processing pipeline 1105. The MSE 4 performs the processing pipeline 1105 based on the flow entries indicated by encircled 27-30. As described above by reference to FIG. 8, packet 2 has the source IP address of 10.0.1.1 and has the IP address of the server VM 1 (11.0.1.1) as the destination IP address. The packet 2 also has the MAC address of port P2 of the logical router 115, 01:01:01:01:01:02, as a source MAC address and has the MAC address of the server VM 1 as the destination MAC address.

Based on the logical context stored in packet 2 header, the MSE 4 then identifies a flow entry indicated by an encircled 27 (referred to as "record 27") in the L2 entries table 1130 that implements the context mapping of the stage 1110. The record 27 identifies the packet 2's logical context based on the logical context that is stored in packet 2's header. The logical context specifies that packet 2 has been processed by the stage 897 of the processing pipeline 801, which was performed by the MSE 2. As such, the record 27 specifies that packet is to be further processed by the MSE 4 (e.g., by sending the packet to a dispatch port of the MSE 4).

The MSE 4 then identifies a flow entry indicated by an encircled 28 (referred to as "record 28") in the L2 entries 1130 that implements generating reverse hint flow entry of the stage 1115. In some embodiments, the last-hop MSE creates and installs a reverse hint. A reverse hint in some embodiments is a flow entry that directs the MSE, which is the last-hop MSE with respect to a particular packet, to send a response packet to the origin of the particular packet without performing logical processing on the response packet. A reverse hint is set up in order to allow the first-hop MSE with respect to the particular packet to perform all or most of the logical processing in some embodiments. As shown, the MSE has installed a reverse hint flow entry indicated by encircled RH (referred to as "record RH"). In this example, the record RH specifies that the MSE 4 sends a packet, which has a five-tuple of a packet from the server VM 1 to the client VM 1 in response to receiving packet 2 (e.g., source IP address: 11.0.1.1, destination IP address: 10.0.1.1, source port number: 80, destination port number: 1234, transport protocol: TCP) to the MSE 2.

Next, the MSE 4 identifies, based on the logical context and/or other fields stored in packet 2's header, a flow entry indicated by an encircled 29 (referred to as "record 29") in the forwarding tables that implements the egress ACL of the stage 1120. In this example, the record 29 allows packet 2 to be further processed (e.g., packet 2 can get out of the logical switch 2 through port 5 of the logical switch 2) and, thus, specifies packet 2 is to be further processed by the MSE 2. In addition, the record 29 specifies that the MSE 4 stores the logical context (i.e., packet 2 has been processed by the stage 1120 of the processing pipeline 1105) of packet 2 in the set of fields of packet 2's header.

Based on the logical context and/or other fields stored in packet 2's header, the MSE 4 then identifies a flow entry indicated by an encircled 30 (referred to as "record 30") in the table 1130 that implements the physical mapping of the stage 1125. The record 30 specifies port 4*b* of the MSE 4 as a port through which packet 2 is to be sent in order for packet 2 to reach the server VM 1. In addition, the record 30 specifies that the MSE 4 removes the logical context of packet 2 from the set of fields of packet 2's header. The MSE 4 sends packet 2 to the server VM 1.

The top side of case 1102 shows the processing pipeline 1105 that the MSE 4 performs on packet 3. As shown in the cases 1101 and 1102, the difference between the processing of the very first packet (packet 2) and the processing a subsequent packet (packet 3) by the MSE 4 (i.e., the last-hop MSE with respect to packets 2 and 3) is that the MSE 4 in some embodiments refreshes the record RH by performing the stage 1115 for packet 4, which is not the first packet sent by the client VM 1 to the server VM 1 that is processed by the MSE 4.

E. Last-Hop Processing of Response Packet

Figure 12:
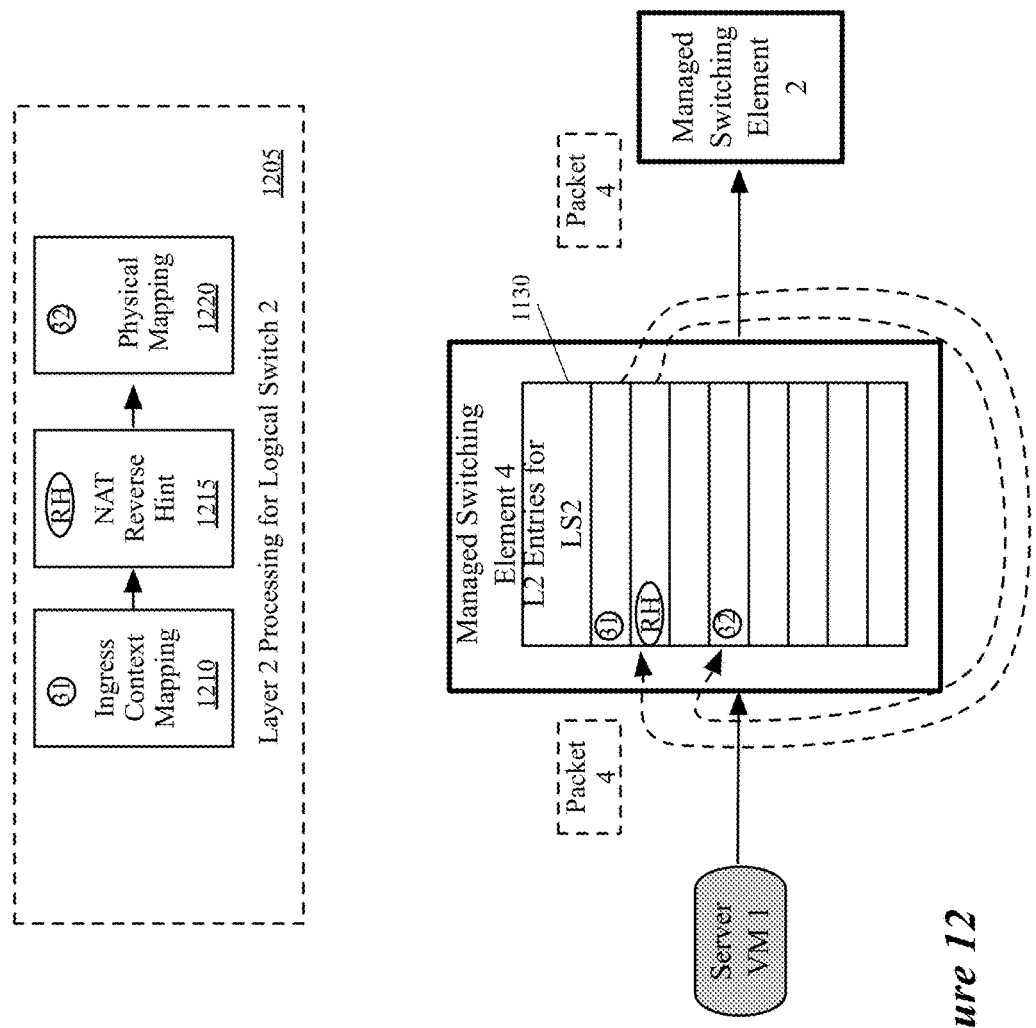
FIG. 12 conceptually illustrates an example operation of a MSE that is a first-hop MSE with respect to a response data packet.

FIG. 12 conceptually illustrates an example operation of a MSE that is a first-hop MSE with respect to a response data packet. Specifically, this figure illustrates an operation of the MSE 4 that processes a packet from the server VM 1 to the client VM 1. In this example, the server VM 1 sends this packet to the client VM 1 in response to receiving a packet from the client VM 1. This figure also illustrates that the MSE 4 processes the response packets according to the reverse hint flow entry.

The top of FIG. 12 illustrates a processing pipeline 1205 that is performed by the MSE 4. The processing pipeline 1205 includes stages 1210-1220. The bottom half of the figure illustrates the MSEs 4 and 2, and the server VM 1. As shown, the MSE 4 includes the table 1130 for storing flow entries.

When the MSE 4 receives packet 4 from the server VM 1 through port 4*b* of the MSE, the MSE 2 identifies a flow entry indicated by an encircled 31 (referred to as "record 31") in the forwarding table 1130 that implements the context mapping of the stage 1210. The record 31 identifies packet 4's logical context based on the ingress port, which is port 4*b* in this example. In addition, the record 31 specifies that the MSE 4 stores the logical context of packet 4 in a set of fields of packet 4's header. The record 31 also specifies packet 4 is to be further processed by the forwarding tables The MSE 4 then identifies the reverse hint flow entry, the record RH. As mentioned above, the record RH specifies that the MSE 4 sends a packet, which has a five-tuple of a packet from the server VM 1 to the client VM 1 in response to packet 2 (e.g., source IP address: 11.0.1.1, destination IP address: 10.0.1.1, source port number: 80, destination port number: 1234, transport protocol: TCP) to MSE 2.

Based on the logical context and/or other fields stored in packet 4's header, the MSE 4 then identifies a flow entry indicated by an encircled 32 (referred to as "record 32") in the table 1130 that implements the physical mapping of the stage 1220. The record 32 specifies port 4*d* of the MSE 4 as a port through which packet 4 is to be sent in order for packet 4 to reach the client VM 1. The MSE 4 sends packet 4 to the MSE 2 through port 4*d* accordingly.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
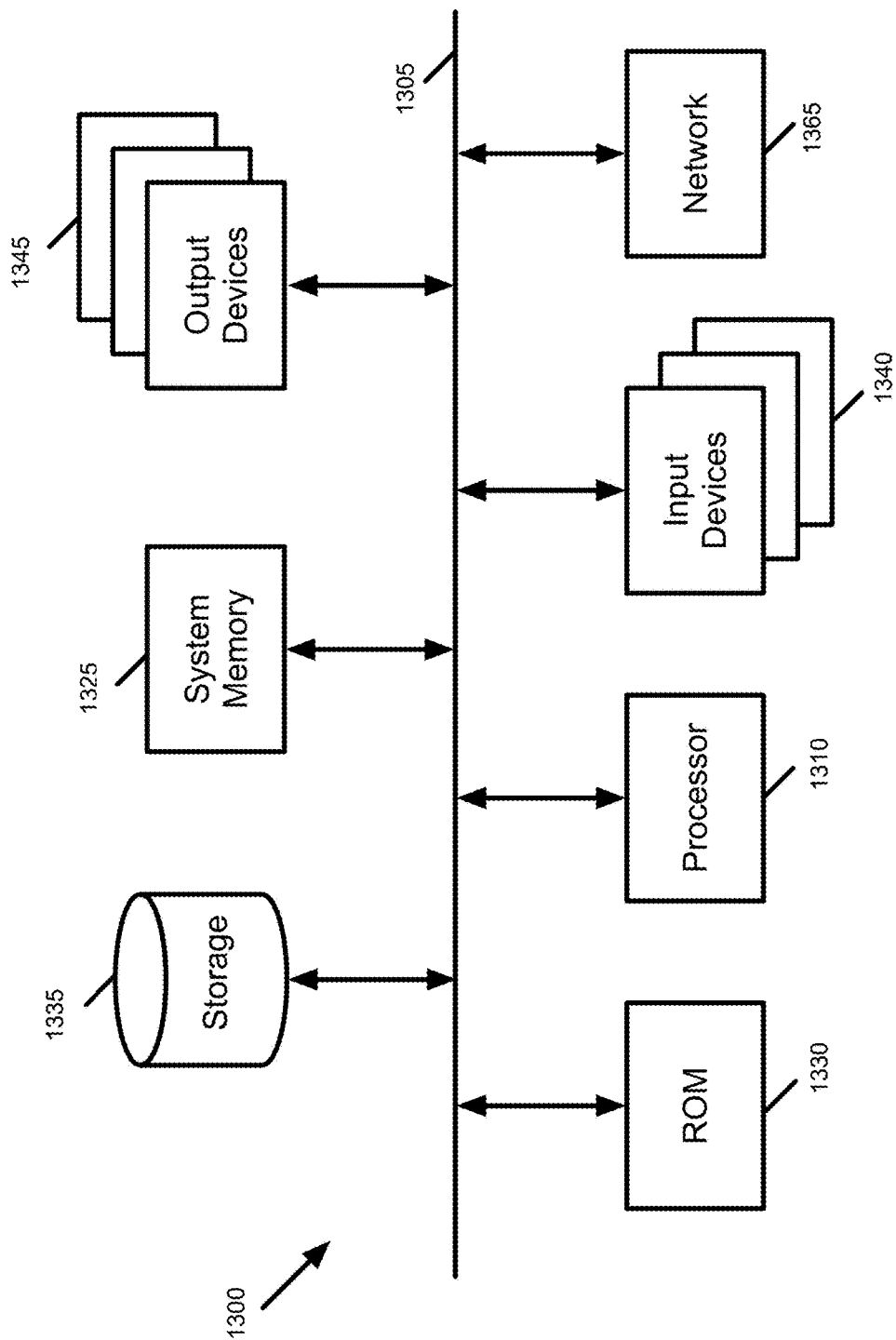
FIG. 13 conceptually illustrates an electronic system with which some embodiments of the invention are implemented.

FIG. 13 conceptually illustrates an electronic system 1300 with which some embodiments of the invention are implemented. The electronic system 1300 may be a computer, server, dedicated switch, phone, or any other sort of electronic device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, or ZIP® disk, and its corresponding disk drive) as the permanent storage device. Like the permanent storage device 1335, the system memory 1325 is a read-and-write memory device. However, unlike storage device 1335, the system memory is a volatile read-and-write memory, such a random access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A non-transitory machine readable medium storing a controller application of a network control system for configuring a logical middlebox in a distributed manner across a plurality of physical machines, the logical middlebox part of a logical network that logically connects a plurality of machines, the controller application comprising sets of instructions for:
    configuring a plurality of middlebox instances, each operating in a different one of the physical machines, to (i) receive a packet directed to a set of servers providing a same service, (ii) select a server from the set of servers to which to send the packet, (iii) create a set of flow entries, using a network address of the selected server, that specify to send subsequent packets having similar characteristics to the received packet to the selected server, and (iv) provide the created set of flow entries to a corresponding managed forwarding element operating in the physical machine with the middlebox instance; and
    configuring managed forwarding elements in the plurality of physical machines to forward subsequent packets based on the set of flow entries created by the corresponding middlebox instance without the corresponding middlebox instance processing the subsequent packets.

2. The non-transitory machine readable medium of claim 1, wherein the middlebox instance in a particular physical machine receives a set of template flow entries from the managed forwarding element in the particular physical machine along with the received packet, the set of template flow entries for use in creating the set of flow entries provided to said managed forwarding element.

3. The non-transitory machine readable medium of claim 1, wherein the set of flow entries causes the managed forwarding element to replace a destination network address of the subsequent packets directed to the set of servers with the network address of the selected server.

4. A non-transitory machine readable medium storing a first controller of a network control system for configuring a load balancer in a distributed manner across a plurality of host machines, the load balancer part of a logical network that logically connects a plurality of machines, the network control system comprising a plurality of controllers, the controller comprising sets of instructions for:
    receiving configuration data for the load balancer that specifies rules for selecting a server from a set of servers for packets, having a destination address corresponding to the set of servers, that are received at instances of the load balancer;
    identifying a plurality of host machines, on at least a subset of which machines of the plurality of machines connected by the logical network operate, on which to implement the load balancer;
    identifying a set of additional controllers in the network control system that manage the identified host machines on which to implement the load balancer; and
    distributing the configuration data for the load balancer to the identified set of additional controllers in order for the additional controllers to provide the configuration data to middlebox instances on the host machines.

5. The non-transitory machine readable medium of claim 4, wherein the configuration data includes a set of network addresses of the set of servers and a virtual network address shared by the set of servers, wherein the destination address of the packets is the virtual network address.

6. The non-transitory machine readable medium of claim 4, wherein the configuration data includes a set of selection rules for selecting a server from the set of servers.

7. The non-transitory machine readable medium of claim 5, wherein a middlebox instance implementing the load balancer in a host machine replaces a destination network address of a received packet directed to the virtual network address with the network address of a selected one of the servers.

8. The non-transitory machine readable medium of claim 4, wherein the first controller is a logical controller and the identified set of additional controllers are physical controllers.

9. The non-transitory machine readable medium of claim 4, wherein the network control system is for generating physical control plane data for directing first and second managed forwarding elements to implement forwarding operations associated with a first logical datapath set, wherein the controller further comprises a set of instructions for converting logical control plane data for the first logical datapath set to universal physical control plane data.

10. The non-transitory machine readable medium of claim 9, wherein the first controller is a master controller for the first logical datapath set, wherein each of the identified set of additional controllers is a master controller for a set of managed forwarding elements that operate in the same host machines on which the load balancer is implemented.

11. The non-transitory machine readable medium of claim 1, wherein the plurality of middlebox instances select servers from the set of servers in order to balance workload across the set of servers.

* * * * *